US011545042B2

(12) United States Patent
Harlow et al.

(10) Patent No.: US 11,545,042 B2
(45) Date of Patent: *Jan. 3, 2023

(54) PERSONALIZED LEARNING SYSTEM

(71) Applicant: CEREGO JAPAN KABUSHIKI KAISHA, Tokyo (JP)

(72) Inventors: Iain Harlow, San Diego, CA (US); Archana Ramalingam, San Diego, CA (US); John Braunlin, San Diego, CA (US); Kyle Stewart, San Diego, CA (US); Laila Vinson, San Diego, CA (US); Tyler Duni, San Diego, CA (US); Phaedrus Raznikov, San Diego, CA (US); Eric Young, Tokyo (JP); Jon-David Hague, San Diego, CA (US)

(73) Assignee: CEREGO JAPAN KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/586,945

(22) Filed: Jan. 28, 2022

(65) Prior Publication Data

US 2022/0157189 A1    May 19, 2022

Related U.S. Application Data

(63) Continuation of application No. 17/464,328, filed on Sep. 1, 2021.

(Continued)

(51) Int. Cl.
*G09B 7/00* (2006.01)
*G06F 16/23* (2019.01)
(Continued)

(52) U.S. Cl.
CPC ........... *G09B 7/00* (2013.01); *G06F 16/2379* (2019.01); *G06F 40/30* (2020.01); *G06T 11/203* (2013.01);
(Continued)

(58) Field of Classification Search
None
See application file for complete search history.

(56) References Cited

U.S. PATENT DOCUMENTS 10,248,738 B2 *   4/2019   Clark ................ G06F 16/345
2009/0099998 A1 *  4/2009   Verspoor ............. G06N 20/00
                                                    706/55

(Continued)

OTHER PUBLICATIONS

Harlow et al., "Personalized Learning System", U.S. Appl. No. 17/464,328, filed Sep. 1, 2021.

*Primary Examiner* — Jeffrey J Chow
(74) *Attorney, Agent, or Firm* — Keating and Bennett, LLP

(57) ABSTRACT

A learning system includes a non-transitory memory, and one or more hardware processors configured or programmed to read instructions from the non-transitory memory to cause the learning system to perform operations including generating a user knowledge mesh including generating topic nodes each corresponding to a topic included in the user knowledge mesh, and generating concept nodes each corresponding to a key learnable concept, wherein each of the topic nodes is connected to another one of the topic nodes, each of the concept nodes is connected to one of the topic nodes, and each of the key learnable concepts includes one or more interactions related to the key learnable concept.

28 Claims, 16 Drawing Sheets

Related U.S. Application Data

(60) Provisional application No. 63/168,978, filed on Mar. 31, 2021, provisional application No. 63/073,749, filed on Sep. 2, 2020.

(51) Int. Cl.
*G06F 40/30* (2020.01)
*G06T 11/20* (2006.01)
*G09B 7/04* (2006.01)
*G09B 7/08* (2006.01)

(52) U.S. Cl.
CPC ...... *G06T 2207/20081* (2013.01); *G09B 7/04* (2013.01); *G09B 7/08* (2013.01)

(56) References Cited

U.S. PATENT DOCUMENTS

| | | | |
|---|---|---|---|
| 2013/0293551 A1* | 11/2013 | Erez | G06T 11/206 345/440 |
| 2014/0308634 A1* | 10/2014 | Mishra | G09B 19/00 434/236 |
| 2016/0189036 A1* | 6/2016 | Shakeri | G06F 16/2455 706/47 |
| 2019/0012405 A1* | 1/2019 | Contractor | G06F 16/248 |
| 2019/0114937 A1* | 4/2019 | Capps | G06Q 10/0639 |
| 2020/0118035 A1* | 4/2020 | Asawa | G06N 3/08 |
| 2020/0320116 A1* | 10/2020 | Wu | G06F 16/45 |
| 2021/0286950 A1* | 9/2021 | Quamar | G06N 20/00 |

* cited by examiner

PERSONALIZED LEARNING SYSTEM

RELATED APPLICATIONS

This patent application claims priority to and benefit of the filing date of U.S. Provisional Patent Application No. 63/073,749, entitled "Personalized Learning System and Integration of the Same With Videoconferencing and Teleconferencing Platforms and Applications," filed on Sep. 2, 2020, which is hereby incorporated by reference in its entirety, and U.S. Provisional Patent Application No. 63/168,978, entitled "Personalized Learning System and Integration of the Same With Platforms and Applications," filed on Mar. 31, 2021, which is hereby incorporated by reference in its entirety.

BACKGROUND OF THE INVENTION

1. Field of the Invention

One or more preferred embodiments of the present invention relate generally to personalized learning systems.

2. Description of the Related Art

A conventional grade for a course (e.g., an A) provides information in which the relationship between the grade for the course and the actual declarative knowledge (e.g., a list of concepts or skills) is ambiguous. For example, to interpret what an individual that received a grade of an A in a Mathematics course has actually learned requires access to the curriculum of the specific course for which the individual scored the grade. Furthermore, two people with similar grades from different Mathematics courses may have different levels of knowledge of Linear Algebra for example, depending on the specific curriculum each Mathematics course followed, which may also be the case for the same course and course provider taken at different moments in time since the curriculum of a course may change. Furthermore, even with access to the specific curriculum, it is not possible to determine from a traditional course grade how well an individual performed on each part of the curriculum because doing so would also require access to the individual's specific transcript from the institution which may not be available, and/or be presented in a non-standard format. Furthermore, even with a transcript, the user's knowledge state for individual concepts or topics from the course are still ambiguous because they are fixed numbers, based on a moment or period of time in the past. For example, a course transcript may reveal that two individuals in the same course each achieved a score of 80% on the final exam for Linear Algebra. In this case, it is not possible to know which individual has retained more of the material over time, and hence what the current knowledge state for each individual might be. Additionally, an exam can only ever test a subset of the material being learned in a course. A first individual may have scored 80% because the first individual built a strong understanding of the entire Linear Algebra course while a second individual may have scored 80% because the second individual focused on a subset of content and was fortunate that the exam covered that subset of content and not another. In short, exam scores and other moment-in-time course outcome measurements and grades are often used as proxies for knowledge states because they are available, but they do not directly correspond to an individual's current knowledge state, especially as time since the exam passes.

SUMMARY OF THE INVENTION

Preferred embodiments of the present invention provide personalized learning systems.

According to a preferred embodiment of the present invention, a learning system includes a non-transitory memory, and one or more hardware processors configured or programmed to read instructions from the non-transitory memory to cause the learning system to perform operations including generating a user knowledge mesh, wherein the operation of generating the user knowledge mesh includes generating a plurality of topic nodes, each of the plurality of topic nodes corresponding to a topic included in the user knowledge mesh, and generating a plurality of concept nodes, each of the plurality of concept nodes corresponding to a key learnable concept, wherein each of the plurality of topic nodes is connected to another one of the plurality of topic nodes, each of the plurality of concept nodes is connected to one of the plurality of topic nodes, and each of the plurality of key learnable concepts includes one or more interactions related to the key learnable concept.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

Figure 1:
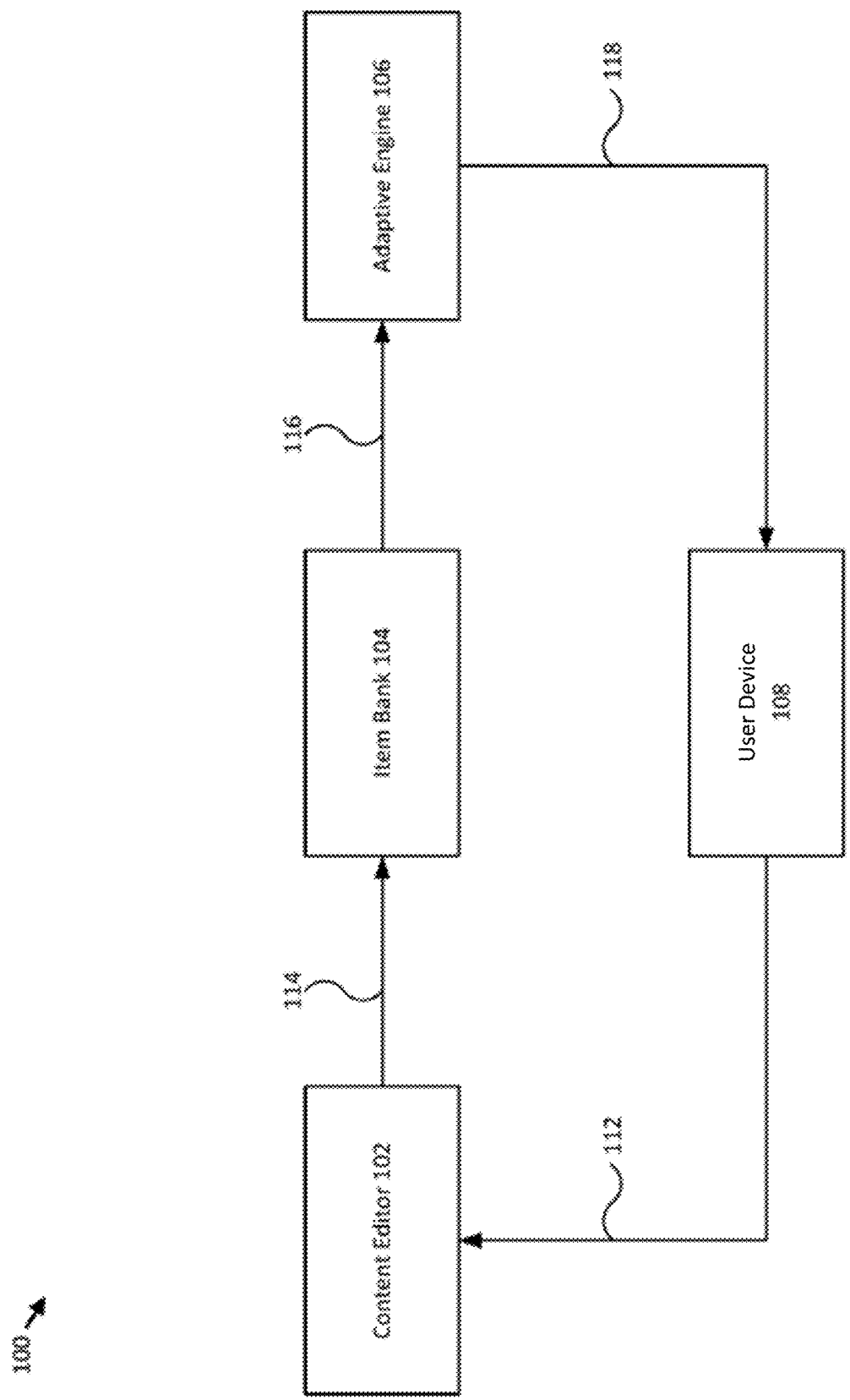
FIG. 1 illustrates a block diagram of a learning system including a content editor, an item bank, an adaptive engine, and a user device in accordance with a preferred embodiment of the present invention.

FIG. 1 illustrates a block diagram of a learning system 100 including a content editor 102, an item bank 104, an adaptive engine 106, and one or more user devices 108 in accordance with an example preferred embodiment of the present invention.

As further described herein, the content editor 102 may be a content editor processor in wired or wireless communication with the one or more user devices 108. In particular, the content editor 102 may be in communication with a network (e.g., a base station network) that is also in wireless communication with the one or more user devices 108, as discussed in more detail below. Such wireless communication may be implemented in accordance with various wireless technologies including, for example, Code division multiple access (CDMA), Long Term Evolution (LTE), Global System for Mobile Communications (GSM™), Wi-Fi™, Bluetooth™, or other standardized or proprietary wireless communication techniques.

Content editor 102 may be implemented as a processor configured or programmed to receive, retrieve, and process content 112 from the one or more user devices 108. Content 112 may be a content data packet that includes text, figures, images, videos, and/or audio content, for example.

In a preferred embodiment of the present invention, a user can use the user device 108 to identify content 112 to be received by the content editor 102. Items 114 may be objects and/or the building blocks of the learning processes as further described herein. Content editor 102 may transfer items 114 to item bank 104 to store items 114.

Adaptive engine 106 is able to create and transmit interactions 118 to the one or more user devices 108. In a preferred embodiment of the present invention, the adaptive engine 106 is able to generate interactions 118 based on the items 116 from the item bank 104, and transmit the interactions 118 to a user device 108 in order for the user to respond to the interaction or have access to the information included in the interaction. In a preferred embodiment of the present invention, the adaptive engine 106 is able to determine the type of the interactions 118, such as a multiple-choice question and/or a fill-in-the-blank question. In another example, the interaction 118 may provide information to the user, for example, using text, figures, images, videos, and/or audio contents.

The adaptive engine 106 can be a processor configured or programmed to define and function as a cloud-based personalized learning engine and/or artificial intelligence engine to generate the one or more interactions. In some examples, the one or more interactions may be generated based on a user's history with similar interactions. Thus, the learning system 100 is able to generate a personalized learning experience based on the one or more interactions.

In a preferred embodiment of the present invention, learning system 100 can generate user data and/or a user model that may be used to curate the interactions. The user data and/or user model may include one or more metrics that indicate the user's level of retention and/or understanding of a particular topic based on the user's responses to the one or more interactions, for example. Examples of such a processor or processors defining the adaptive engine 106 to function and perform as a cloud-based personalized learning engine and/or artificial intelligence engine to generate the one or more interactions based on user data and/or a user model are described in greater detail in U.S. patent application Ser. No. 15/836,631, entitled "Personalized Learning System And Method For The Automated Generation of Structured Learning Assets Based On User Data," filed on Dec. 8, 2017 and in U.S. patent application Ser. No. 15/977,950, entitled "Personalized Learning Systems and Methods," filed on May 11, 2018, both of which are hereby incorporated herein by reference in their entirety.

Figure 2:
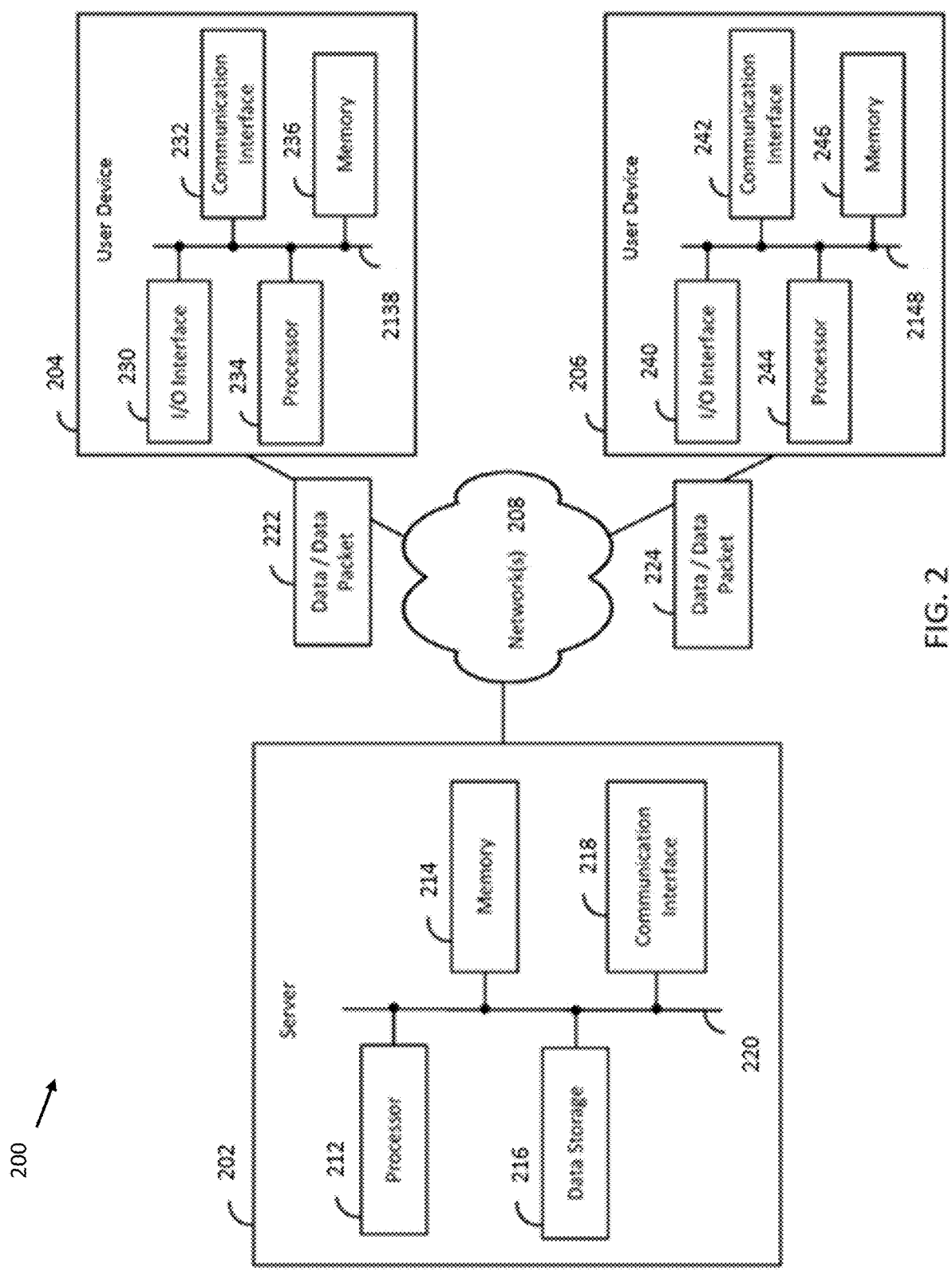
FIG. 2 illustrates a block diagram of a learning system in accordance with a preferred embodiment of the present invention.

FIG. 2 illustrates a block diagram of a learning system in accordance with a preferred embodiment of the present invention. The learning system includes a server 202, a communication network 208, and one or more user devices 204 and 206. The server 202 may include various components described herein, such as the content editor processor 102, the item bank 104, and the adaptive engine 106. For example, the content editor processor 102 and/or the adaptive engine 106 may take the form of processor 212.

The server 202 may receive respective data packets 222 and 224 from the user devices 204 and 206. For example, the data packets 222 and 224 may be data content packets as further described herein. The data packets 222 and 224 may be received over communication network 208, and may be transferrable using communication protocols such as packet layer protocols, packet ensemble protocols, and/or network layer protocols, such as transmission control protocols and/or internet protocols (TCP/IP). The communication network 208 may include a data network such as a private network, a local area network, and/or a wide area network. The communication network 208 may also include a telecommunications network and/or a cellular network with one or more base stations, among other possible networks. The server 202 may include the hardware processor 212, a memory 214, a data storage 216, and/or a communication interface 218, any of which may be communicatively linked via a system bus, network, or other connection mechanism 220. The processor 212 may be a multipurpose processor, a microprocessor, a special purpose processor, a digital signal processor (DSP) and/or other types of processing components configured or programmed to process content data as further described herein.

The memory 214 and the data storage 216 may include one or more volatile, non-volatile, and/or replaceable data storage components, such as a magnetic, optical, and/or flash storage that may be integrated in whole or in part with the processor 212. The memory component 214 may include a number of instructions and/or instruction sets. The processor 212 may be coupled to the memory component 214 and configured to read the instructions to cause server 202 to perform operations, such as those described herein. Data storage 216 may be configured to facilitate operations involving a growing library of digital materials as further described herein. Communication interface 218 may allow server 202 to communicate with user devices 204 and 206. Communication interface 218 may include a wired interface, such as an Ethernet interface, to communicate with user devices 204 and 206. Communication interface 218 may also include a wireless interface, such as a cellular interface, a Global System for Mobile Communications (GSM) interface, a Code Division Multiple Access (CDMA) interface, and/or a Time Division Multiple Access (TDMA) 0 interface, among other possibilities. Communication interface 218 may send/receive data packets 222 and 224 to/from the user devices 204 and 206.

The user devices 204 and 206 may take the form of a smartphone system, a personal computer (PC) such as a laptop device, a tablet computer device, a wearable computer device, a head-mountable display (HMD) device, a smart watch device, and/or other types of computing devices configured to transfer data. Examples of learning systems that include the server 202, the communication network 208, and user devices 204 and 206 are described in greater detail in U.S. patent application Ser. No. 15/264,438, which is hereby incorporated by reference herein in its entirety.

In a preferred embodiment of the present invention, the processor 212 and/or the processor 234/244 of the user device 204/206 are configured or programmed to perform functions of the learning system 100.

For example, in a preferred embodiment of the present invention, the processor 212 and/or the processor 234/244 of the user device 204/206 are configured or programmed to generate a novel user knowledge mesh, discussed in detail below. A visualization, illustration or representation (hereinafter "visualization") of the user knowledge mesh is able to be displayed on an input/output interface (I/O Interface) 230/240 of the user device 204/206, for example.

Figure 3:
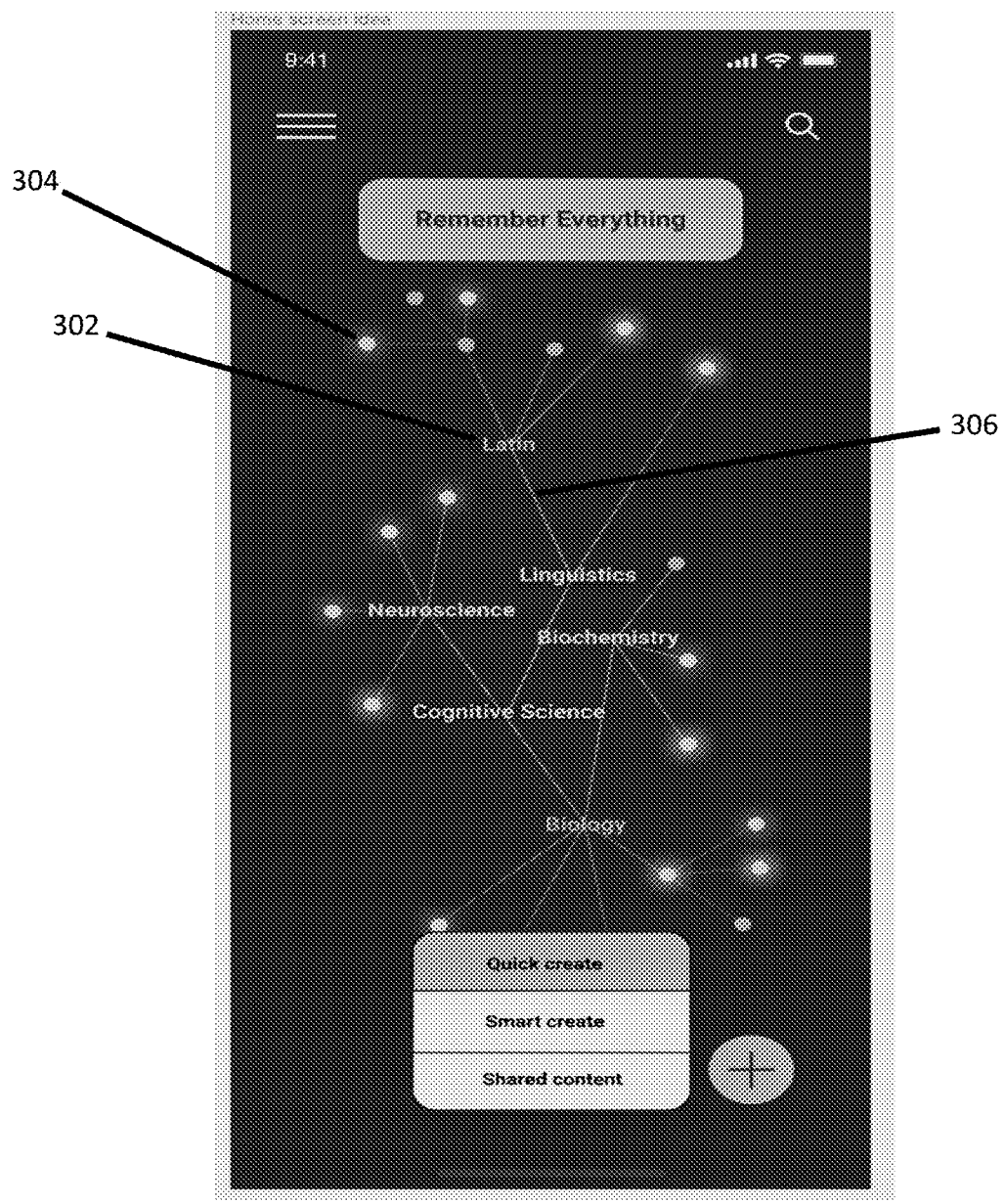
FIG. 3 illustrates a visualization of a user knowledge mesh in accordance with a preferred embodiment of the present invention.

As shown in FIG. 3, a visualization of the user knowledge mesh includes a plurality of topic nodes 302 (e.g., Latin, Linguistics, Neuroscience, Biochemistry, Cognitive Science, Biology) and a plurality of concept nodes 304. Preferably, each concept node is directly connected to a single topic node and a topic node represents a collection of related concept nodes. Each concept node in the user knowledge mesh corresponds to a key learnable concept, and each key learnable concept includes one or more interactions such as a quiz question (e.g., a multiple-choice quiz question and/or a fill-in-the-blank) or other type of interaction that tests and/or strengthens the user's knowledge of the key learnable concept.

A key learnable concept can be a single concrete definition, a relationship, or a more complex structure such as the ability to complete a task. A key learnable concept does not necessarily need to be in written form and can exist implicitly instead. For example, a quiz question or other type of interaction created by a user for a key learnable concept can determine the content of the key learnable concept. For instance, if a user creates a quiz question of the form "Who is the author of The State Theory of Money?", the key learnable concept can be defined as the relationship "Georg Friedrich Knapp"→relationship: author→"State Theory Of Money". Alternatively, an example of a "complete a task" key learnable concept can include one or more quiz questions that require the user to indicate an order of a series of steps in a process such as tying a tourniquet correctly, or to reproduce the series of steps by selecting the steps from a list or naming or describing the steps, for example.

In a preferred embodiment of the present invention, a strength of connection between any two topics, which correspond to topic nodes in the user knowledge mesh, is able to be returned at any time, on demand, by querying an Application Programming Interface (API) endpoint of the learning system that calculates the semantic similarity between the two topics, as discussed in detail below. Preferably, the API endpoint takes the form of a dedicated module on AWS Lambda, which is a computing platform provided by Amazon as a part of Amazon Web Services that runs code in response to events and automatically manages the computing resources required by the code. The API endpoint is able to receive, as an input, a list of topic pairs together with text corresponding to each topic. The text corresponding to each topic includes, for example, the topic title, the text of the interactions for the key learnable concepts included in the topic, incorrect answer choices (distractors) and correct answer choices for each of the interactions, and the text from the source document that the topic was generated from, if applicable. The API endpoint returns a semantic similarity score for each of the topic pairs, using an approach discussed in detail below. The API endpoint is able to be called by code from other parts of the learning system whenever a semantic similarity score between two topics is desired.

The strength of connection between two topics can be represented in the visualization of the user knowledge mesh. For example, the topic nodes corresponding to topics of greater semantic similarity are able to be connected by a shorter edge and/or by a thicker, brighter, or otherwise more visually distinct line, for example. In other words, the line connecting a first topic node and a second topic node can be generated based on the semantic similarity between a first topic that corresponds to the first topic node and a second topic that corresponds to the second topic node. For example, as shown in FIG. 3, the length and brightness of the line 306 connecting the topic node of "Latin" and the topic node of "Linguistics" can represent the strength of connection (e.g., the semantic similarity) between the topics of Latin and Linguistics.

Figure 4:
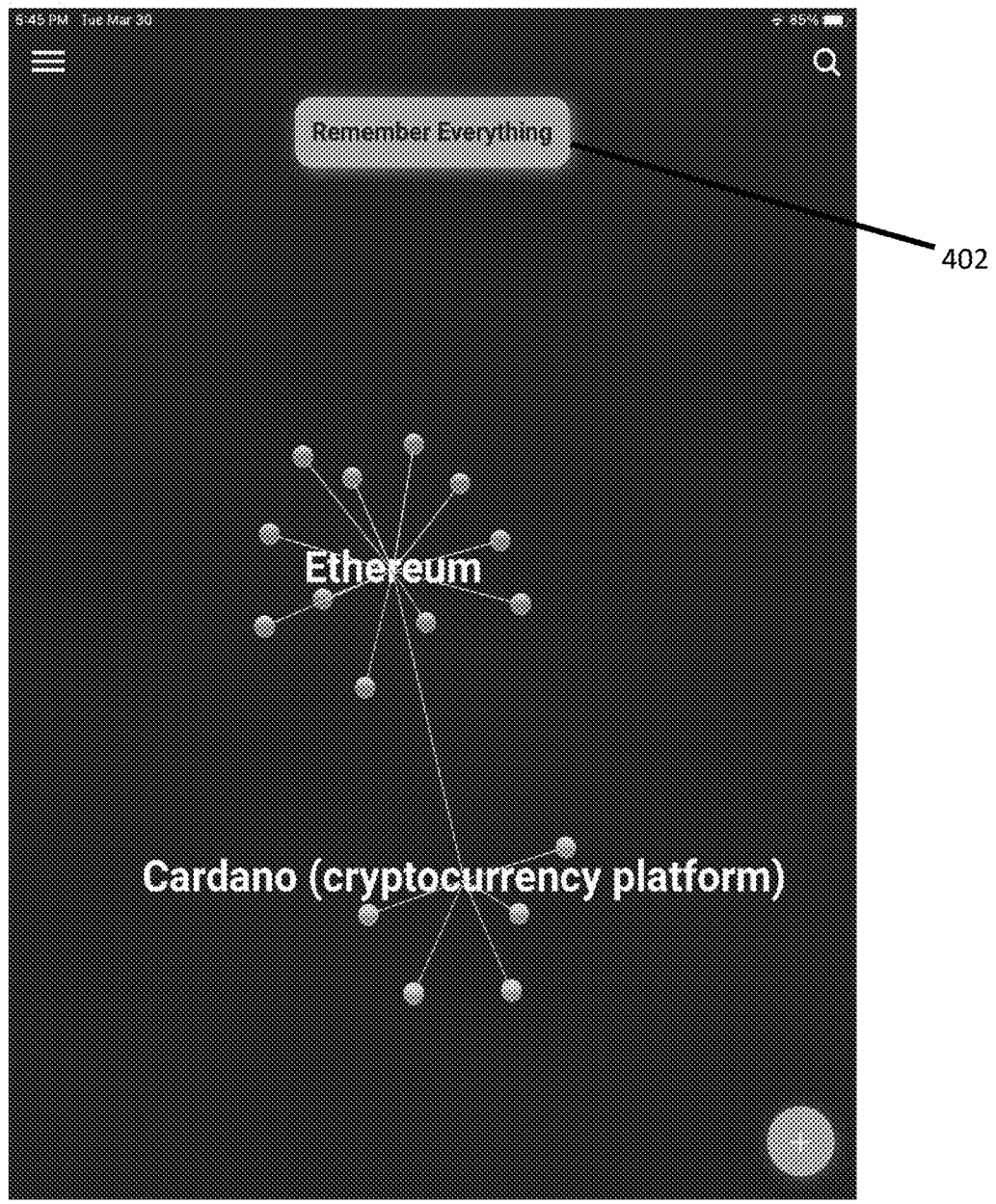
FIG. 4 illustrates a visualization of a user knowledge mesh in accordance with a preferred embodiment of the present invention.

Additionally, as shown in FIG. 4, the visualization of the user knowledge mesh includes two topic nodes for the related topics of "Ethereum" and "Cardano (cryptocurrency platform)" and each concept node (sphere) in the user knowledge mesh represents a single key learnable concept. The color of each concept node is able to indicate a user's readiness with respect to the key learnable concept that corresponds to the concept node, as discussed in more detail below. For example, the green color of the concept nodes connected to the topic node of "Cardano (cryptocurrency platform)" is able to indicate that the user's readiness with respect to the key learnable concepts that correspond to the concepts nodes are above a predetermined readiness threshold, for example. In a preferred embodiment of the present invention, the color of a concept node can be changed (e.g., from gray to green) when the user's readiness score for the key learnable concept that corresponds to the concept node is above the predetermined readiness score threshold.

In a preferred embodiment of the present invention, the processor 212 and/or the processor 234/244 of the user device 204/206 are configured or programmed to generate and connect new topics and key learnable concepts to the user knowledge mesh. The new topics and key learnable concepts can be generated directly by a user or using a creation function of the learning system that utilizes structured content (e.g. databases, Wikipedia, etc.) or unstructured content (e.g. a meeting transcript, a web page, a photo, etc.).

When a key learnable concept is generated directly by a user, the user defines the key learnable concept by creating one or more interactions such as a quiz question for the key learnable concept using a built-in editor of the learning system. For example, a user is able to use a quick create quiz function in which a user enters a keyword, a question phrase, and a correct answer phrase in order to create a new quiz question such as a Question & Answer single select or multiple select quiz question. Preferably, the user is also able to include text, image, audio, and/or video content in the question phrase and/or the correct answer phrase. Preferably, the learning system automatically generates incorrect answer choices (distractors) for the quiz question, as discussed in more detail below.

When the new topics and key learnable concepts are generated using the creation function of the learning system, a user enters a desired topic phrase and artificial intelligence is used to generate a list of potential topics that match the entered desired topic phrase. The user then selects one or more topics from the list of potential topics and artificial intelligence generates one or more interactions related to each of the selected topics. The steps included in the creation functionality are discussed in more detail below with respect to FIG. 5.

Figure 5:
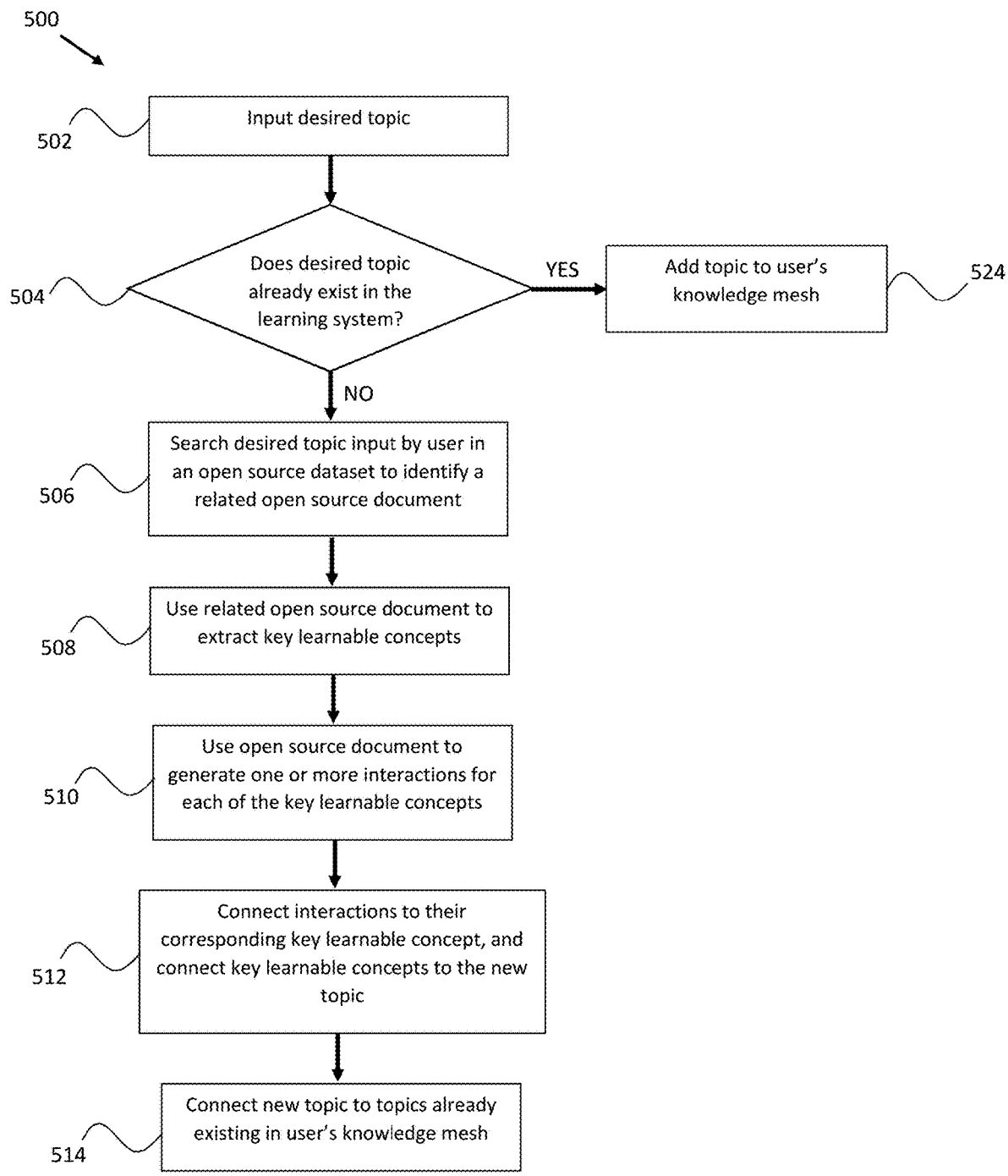
FIG. 5 illustrates processes for generating new topics and key learnable concepts performed by a learning system in accordance with a preferred embodiment of the present invention.
Figure 6:
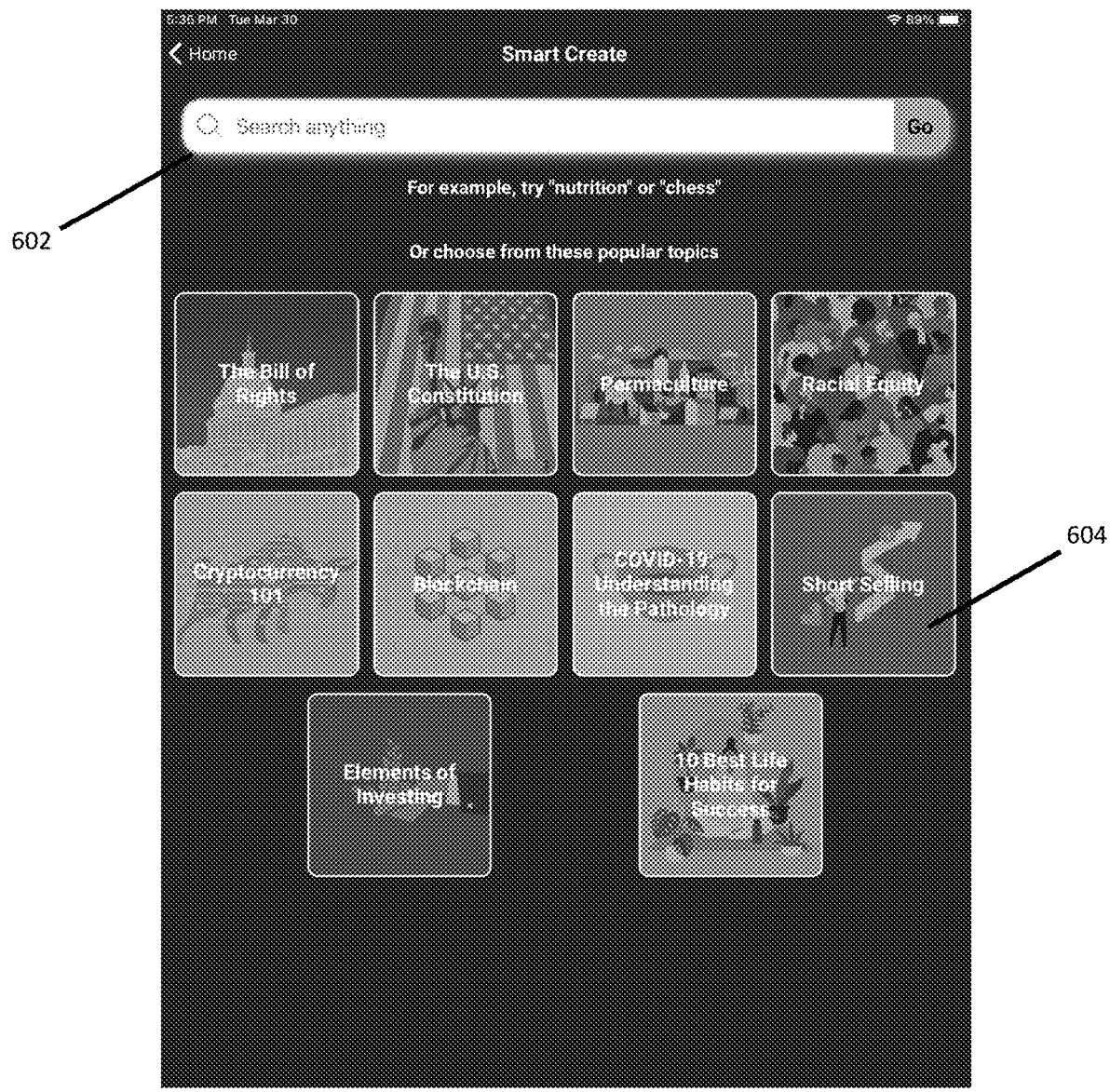
FIG. 6. illustrates a screen of a learning system in accordance with a preferred embodiment of the present invention.

Referring now to FIG. 5, blocks 502-514 of process 500 may be performed by the processor 212 and/or the processor 234/244 of the learning system. In block 502, a desired topic is input by a user. For example, a user can use the I/O Interface 230/240 of the user device 204/206 to type a search string corresponding to the user's desired topic. For example, the user is able to type a search string into the search box 602 of the I/O Interface 230/240 shown in FIG. 6.

In response, in block 504, the learning system determines whether or not the desired topic input by the user in block 502 already exists in the learning system. For example, the learning system determines if a previously created topic and corresponding key learnable concepts and interactions that correspond to the user's desired topic are already stored in the memory 214 and/or memory 236/246 via an API call to the memory of the learning system. In other words, the learning system attempts to match the user's desired topic to a previously created topic that has already been created and stored in the learning system via an API call to the memory of the learning system.

In block 504, a previously created topic that has already been created and stored in the learning system is able to be identified when the previously created topic has a title that is an exact match to the search string for the user's desired topic. Alternatively, previously created and stored topics that are potential matches to the user's desired topic are able to be identified when the titles of the previously created and stored topics are a close lexical match to the search string, for example, by calculating the Levenshtein distance between the titles of the previously created and stored topics and the user's search string. For example, if the user's search string is "Cryptocurrency 101" a previously created and stored topic with the title "Cryptocurrencies 101" may be identified.

Additionally, previously created and stored topics that are potential matches to the user's search string are able to be found by rule-based lexical matching such as stemming (e.g. "cryptocurrency 101") or lemmatizing ("cryptocurrency 101") the user search string and the titles of the previously created topics before comparison.

Additionally, previously created and stored topics that are potential matches to the user's search string are able to be identified based on a vector distance between representations of the title of a previously created and stored topic and the user's search string in a semantic embedding model such as the Word2Vec. The Word2Vec model uses a neural network to encode words and phrases as embeddings, while preserving the semantic relationship between them. By incorporating the part-of-speech (POS) for each term, the Word2Vec model is able to distinguish between similar words with different meanings (e.g.: Apple the noun versus Apple the company).

In a preferred embodiment of the present invention, previously created topics that are potential matches to the user's search string are also able to be found using a combination of the approaches discussed above.

In a preferred embodiment of the present invention, if a plurality of previously created and stored topics are a close match to the user's search string, the plurality of previously created and stored topics can be shown to the user and the user is able to select which of the plurality of previously created and stored topics most closely matches the user's desired topic.

Additionally, in a preferred embodiment of the present invention, when a plurality of previously created and stored topics are a close match to the user's search string, the system may measure the relevancy of each of the plurality of previously created and stored topics to the content already included in the user's knowledge mesh or specified in the user's search string. For example, if the user types "apple" as the search string, and the existing user knowledge mesh contains topics on "iPhone 10 specs" and "Microsoft", the learning system may return content related to the technology company Apple, as opposed to apple the fruit, without requiring further input from the user. The above-discussed approach is able to be used when direct input from the user is not available or desirable. For example, the learning system that includes the above-discussed process is able to allow the user to request a larger volume of content be added to the user knowledge mesh with a single prompt such as "Please add 5-10 topics relevant to the History of the Ottoman Empire", for example. Alternatively, the user can upload a document and request "Please add 3 topics most closely relevant to this document", prompting the system to identify the key learnable concepts in the document or request and build the most relevant possible topics using the above steps, without further input from the user.

In block 504, if the system determines that the desired topic input by the user already exists in the learning system based on the processes discussed above (YES in block 504), then the topic and corresponding key learnable concepts and interactions that already exist in the learning system are added the user's knowledge mesh in block 524.

In a preferred embodiment of the present invention, the user is also able to add a topic that already exists in the learning system by selecting the topic directly from a list of topics that have already been created and stored in the learning system. For example, the user is able to select a topic 604 displayed on the I/O Interface 230/240 (the screen) shown in FIG. 6. The list of topics that have already been created and stored in the learning system can include a list of popular topics that may be filtered based on an average or minimum quality of the topic, discussed in more detail below.

If, on the other hand, it is determined in block 504 that the desired topic input by the user does not already exist in the learning system (NO in block 504), then the process proceeds to block 506. In block 506, the learning system conducts a search for the user's desired topic in an open source dataset, for example, by searching for the user's search string in an open source dataset in order to identify a related open source document. In a preferred embodiment of the present invention, this search may use Wikipedia, via an API call to wikipedia.org to find a related page of the form "en.wikipedia.org/wiki/<topic_string>", for example.

In a preferred embodiment of the present invention, if Wikipedia's API returns a plurality of possible matches (a plurality of related pages), the system may show the plurality of possible matches to the user in order for the user to select the desired related page (e.g., the related page that user believes most closely corresponds to the user's desired topic).

Alternatively, in a preferred embodiment of the present invention, when a plurality of related pages are a close match to the user's search string, the learning system may measure the relevancy of each of the plurality of related pages to the content already included in the user's knowledge mesh or specified in the user's search string. For example, if the user types "apple" as the search string, and the user's existing personal knowledge mesh contains topics on "iPhone 10 specs" and "Microsoft", the system may return pages related to the technology company Apple, as opposed to apple the fruit, without requiring further input from the user. This approach is able to be used when direct input from the user is not available or desirable. For example, the system that includes this process can allow the user to request a larger volume of content be added to the knowledge mesh with a single prompt such as "Please add 5-10 topics relevant to the History of the Ottoman Empire", for example. Alternatively, the user can upload a document and request "Please add 3 topics most closely relevant to this document", prompting the system to identify the key concepts in the document or request and build the most relevant possible topics using the above steps, without further input from the user.

In block 508, the related open source document identified in block 506 is used with generative natural language processing (NLP) models to extract one or more key learnable concepts for the desired topic, as discussed in detail below.

Preferably, a key learnable concept is a single concrete entity or noun phrase such as "stochastic gradient descent algorithm", "The United Nations High Commissioner for Refugees", or "Aristophanes", and may include multiple tokens (e.g., words in Latin-derived languages including English). A key learnable concept is different from a quiz question or fact, and the key learnable concept can be associated with a plurality of interactions such as quiz questions.

In a preferred embodiment of the present invention, in order to extract a key learnable concept from the open source document, the content of the open source document is tokenized and annotated with part-of-speech by a deep learning NLP model as a pre-processing step. Then, a graph is constructed, where each tokenized concept is treated as a node, and an edge is added between concepts that co-occur within a window of a predetermined number of words, n words (n=2 to 10). The co-occurrence links between concepts express relations between syntactic elements, and the system syntactically filters concepts that are nouns to be added to the graph. Initially, each node is assigned a default score of 1, but a graph based ranking algorithm like PageRank is then run to iteratively update each node's score. Preferably, the score is calculated based on a global voting mechanism wherein a node being linked to a second node is considered a vote for the second node and the votes are weighted based on the number of links of the casting node.

In block 510, an open source document and generative NPL models are used to generate one or more interactions (e.g., a quiz question) for each of the key learnable concepts identified in block 508 based on a process discussed in detail below with respect to FIG. 7.

Figure 7:
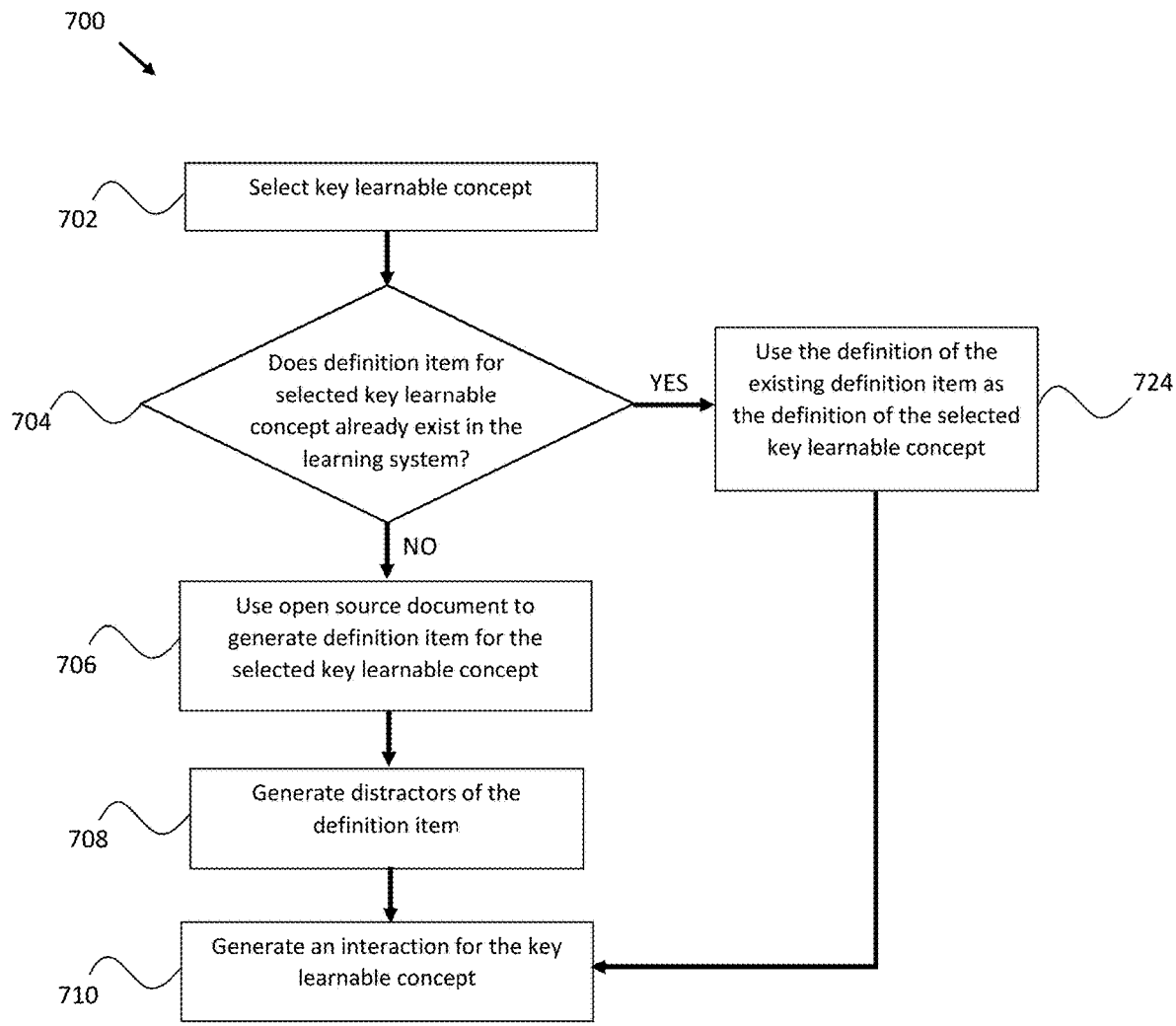
FIG. 7 illustrates processes for generating one or more interactions performed by a learning system in accordance with a preferred embodiment of the present invention.

FIG. 7 shows more details regarding processes included in block 510 of FIG. 5. In a preferred embodiment of the present invention, blocks 702-710 of process 700 iterate over a list of the key learnable concepts identified for the topic such that the blocks 702-710 are performed for each of the key learnable concepts.

Process 700 includes creating a definition item for a selected key learnable concept. In block 702, a key learnable concept is selected from a list of key learnable concepts. In block 704, a search is conducted on existing definition items already created and stored in the learning system, for example, in the memory 214 and/or memory 236/246. The definition items may include definitions automatically created by the learning system or hand-written whitelisted definitions. If an existing definition item is found that matches a search string of the selected key learnable concept (YES in block 704), then the definition of the existing definition item is returned and used as the definition of the key learnable concept (block 724).

On the other hand, if an existing definition item that matches the search string of the selected key learnable concept is not found (NO in block 704), the process proceeds to block 706. In block 706, an open source document is used to generate a definition for the selected key learnable concept. For example, in a preferred embodiment of the present invention, a predetermined portion of the text body of a Wikipedia page with a title corresponding to the key learnable concept is extracted via API. For example, the predetermined portion of the text body of the Wikipedia page can correspond to the first line or the first sentence of the Wikipedia page.

In the example discussed below, the first sentence of the Wikipedia page corresponds to the predetermined portion of the text body of the Wikipedia page. The first sentence of the text body of the Wikipedia page is checked using an NLP model to determine whether the first sentence constitutes a definitional statement. In a preferred embodiment of the present invention, a set of hard-coded linguistic rules can be used to extract a definitional statement from the first sentence of the text body of the Wikipedia page.

In a preferred embodiment of the present invention, definition extraction is performed using a set of hard-coded linguistic rules. First, when the first sentence of the text body of the Wikipedia article has been extracted, the learning system searches for the key learnable concept or a lemmatized version of the key learnable concept in the sentence. Next, if the key learnable concept or a lemmatized version of the key learnable concept is present in the sentence, the learning system then searches for a predefined list of definition patterns that would follow the key learnable concept in the first sentence of the text body of the Wikipedia article. If a definition pattern is present, the learning system extracts the rest of the sentence as the definition of the key learnable concept.

A definitional statement can be extracted from the first sentence of the text body of the Wikipedia page. For example, if the first sentence of the text body of a Wikipedia page is "The California newt or orange-bellied newt (*Taricha torosa*), is a species of newt endemic to California, in the Western United States", the learning system searches for the key learnable concept or a lemmatized version of the key learnable concept in the sentence. In the present example, if the "California newt" is the key learnable concept, then the learning system will identify that the key learnable concept is present in the sentence and search for a predefined list of definition patterns that would follow the key learnable concept in the sentence.

For example, the sentence "The California newt or orange-bellied newt (*Taricha torosa*), is a species of newt endemic to California, in the Western United States" would be classified as including a definition because the sentence includes at least one of the definition patterns included in the predefined list of definition patterns. For example, the sentence includes the definition pattern: (1)<key learnable concept>, (2) <additional information followed by "or" or contained in parentheses>, (3) <comma followed by is/are>, and (4) <short description or definition>. Thus, in the present example, "a species of newt endemic to California, in the Western United States" would be taken as the definition for the key learnable concept of the "California newt".

In a preferred embodiment of the present invention, a deep learning NLP classifier can be trained on hand-scored examples of definitions to identify when a sentence (e.g., the first sentence of the text body of the Wikipedia page) provides a definition of a key learnable concept. Preferably, this is a binary text classification process that involves the following steps discussed in more detail below.

First, the learning system extracts the first sentence from a set of popular Wikipedia pages across diverse topics as a dataset. The extracted dataset preferably has been labeled as to whether or not a given sentence in the dataset is a definition or not, which can be performed manually by a person, for example, using a service such as Amazon Mechanical Turk. Amazon Mechanical Turk is a crowd-sourcing website that businesses can use to hire remotely located "crowdworkers" to perform discrete on-demand tasks.

When the learning system has accessed the labelled dataset, the learning system maps the text of the first sentence to an embedding space, which can be done using simple techniques like one-hot encoding or advanced Transformer based BERT (Bidirectional Encoder Representations from Transformers) or USE (Universal Sentence Encoder) sentence embeddings. For example, a convolution neural network (CNN) can be used for text classification to detect the local definition patterns and the hand-coded salient features in the rule-based approach of the system. A 1-dimensional CNN can be trained and evaluated on a labelled dataset to classify if a given sentence provides a definition or not. When the definition statement is identified in the open source document, the definition statement is split/adjusted using an NPL approach to form a key learning concept/ definition pair.

In a preferred embodiment of the present invention, in block 706, the definition item created for the key learnable concept based on the open source documents is stored in the learning system, for example, in memory 214 and/or memory 236/246 such that the definition item can be searched for and reused in future processes of the learning system.

In a preferred embodiment of the present invention, certain types of interactions, such as multiple-choice questions, include distractors (e.g., incorrect answer choices). In block 708, distractors are generated for the definition item generated in block 706. Examples of a process by which distractors can be generated are described in U.S. patent application Ser. No. 15/977,952, entitled "System For Automatically Generating Concepts Related To A Target," filed on May 11, 2018, which is hereby incorporated herein by reference in its entirety. Additional processes by which distractors can be generated are also discussed below.

In a preferred embodiment of the present invention, if the key learning concept is numeric, the learning system generates a list of numeric distractors within a particular range and matching format of the numeric concept. For example, the format can be: date, time, floating point numbers, etc.

In a preferred embodiment of the present invention, if the key learnable concept is part of the DBpedia knowledge base, the learning system is able to fetch distractor concepts that fall into similar DBpedia categories as the key learnable concept. DBpedia is a community project that creates and provides public access to critical structured data for what is commonly referred to as the Linked Open Data Cloud. In DBpedia, data is published strictly in line with "Linked Open Data" principles that mandate the following: (1) entities are identified using hyperlinks (HTTP URIs); (2) Entities are described using RDF Language based sentences/ statements where the subjects and predicates are identified by HTTP URIs, while objects may be identified using either an HTTP URI or a Literal; and (3) entity descriptions are published to HTTP networks (e.g., the World Wide Web) using RDF documents, where content (from step (2) above) has been serialized using any of a variety of formats (e.g., HTML, JSON-LD, RDF-Turtle, RDF-XML). For example, using the DBpedia knowledge base, if the key learnable concept is a "California Newt", then distractor concepts can be fetched from the DBpedia categories including "Newts" and/or "Endemic fauna of California Newt", for example.

In a preferred embodiment of the present invention, the BERT model can be used to generate a distractor. The BERT model is a transformer based model trained on a task to predict a random word that was removed from a sentence. Preferably, the BERT model expects a masked sentence as an input. For example, the BERT model can accept a question in the fill-in-the-blank format as an input.

In a preferred embodiment of the present invention, a Word2Vec model can be used to generate a distractor. The Word2Vec model uses a neural network to encode words and phrases as embeddings, while preserving the semantic relationship between them. By incorporating the part-of-speech (POS) for each term, the Word2Vec model is able to distinguish between similar words with different meanings (e.g.: Apple the noun versus Apple the organization). The learning system using the Word2Vec model may use cosine similarity between the word embeddings, to get the most semantically related words to the given concept, with similar POS. Preferably, the learning system using the Word2Vec model is also able to distract a single token of a multi-token concept, if the entire concept is out of vocabulary (OOV).

In a preferred embodiment of the present invention, distractors for a key learnable concept can also be generated based on a list of concepts extracted from a Wikipedia article. For example, the learning system is able to rank the list of concepts by a Levenshtein distance to the key learnable concept in order to generate the most similar distractors. More specifically, the learning system trains an XGBoost scoring model on a dataset extracted from the user created distractors and user feedback (e.g., whether or not the distractor was selected). Various linguistic features of the target concept and the distractors including POS tags, word or phrase length, Levenshtein distance, and Wordnet based features like path similarity, hierarchy, hypernym/hyponym details are used to train the XGBoost scoring model. Based on the model score, the distractors generated in the above steps are ranked.

In block 710, an interaction is generated using the definition item generated for the key learnable concept in block 706 or the definition that already existed for the key learnable concept in the learning system (block 724). When the interaction generated is an interaction that includes one or more distractors (e.g., the interaction is a multiple-choice question), the interaction can include the distractors generated in block 708.

In a preferred embodiment of the present invention, a plurality of interactions can be generated based on the key learnable concept and the distractors of the key learnable concept, as discussed in detail below. For example, a definition/key learnable concept pair discussed above can be converted into the form of a quiz question, for example, "Which of these is a species of newt endemic to California, in the Western United States?", with the corresponding answer being the key learnable concept, "California Newt". The quiz question may also be phrased in the reverse, e.g. "What is a California Newt?" with the corresponding answer being "A species of newt endemic to California, in the Western United States". The definition/key learnable concept pair can also simply be returned as an interaction that is a key learnable concept/definition flashcard.

In a preferred embodiment of the present invention, a fill-in-the-blank interaction can be generated by deleting a key learnable concept from a contextual sentence in which it appears. For example, if the key learnable concept is "iambic trimeter" and the sentence is "Aristophanes achieves an effect resembling natural speech through the use of the iambic trimeter", then the fill-in-the-blank interaction can be "Aristophanes achieves an effect resembling natural speech through the use of the ___," and the answer is "iambic trimeter".

In a preferred embodiment of the present invention, a question and answer single select interaction can also be generated using the key learnable concept and the distractors. For example, for this interaction, the user is presented with a question and two or more answer choices, wherein one of the answer choices is the correct answer to the question and the other answer choices are incorrect answers to the question. For example, the correct answer may correspond to the key learnable concept and the incorrect answers may correspond to the distractors. The user is prompted to select an answer choice, and after the user has submitted an answer choice, the user is informed whether or not the user chose the correct answer.

Figure 8:
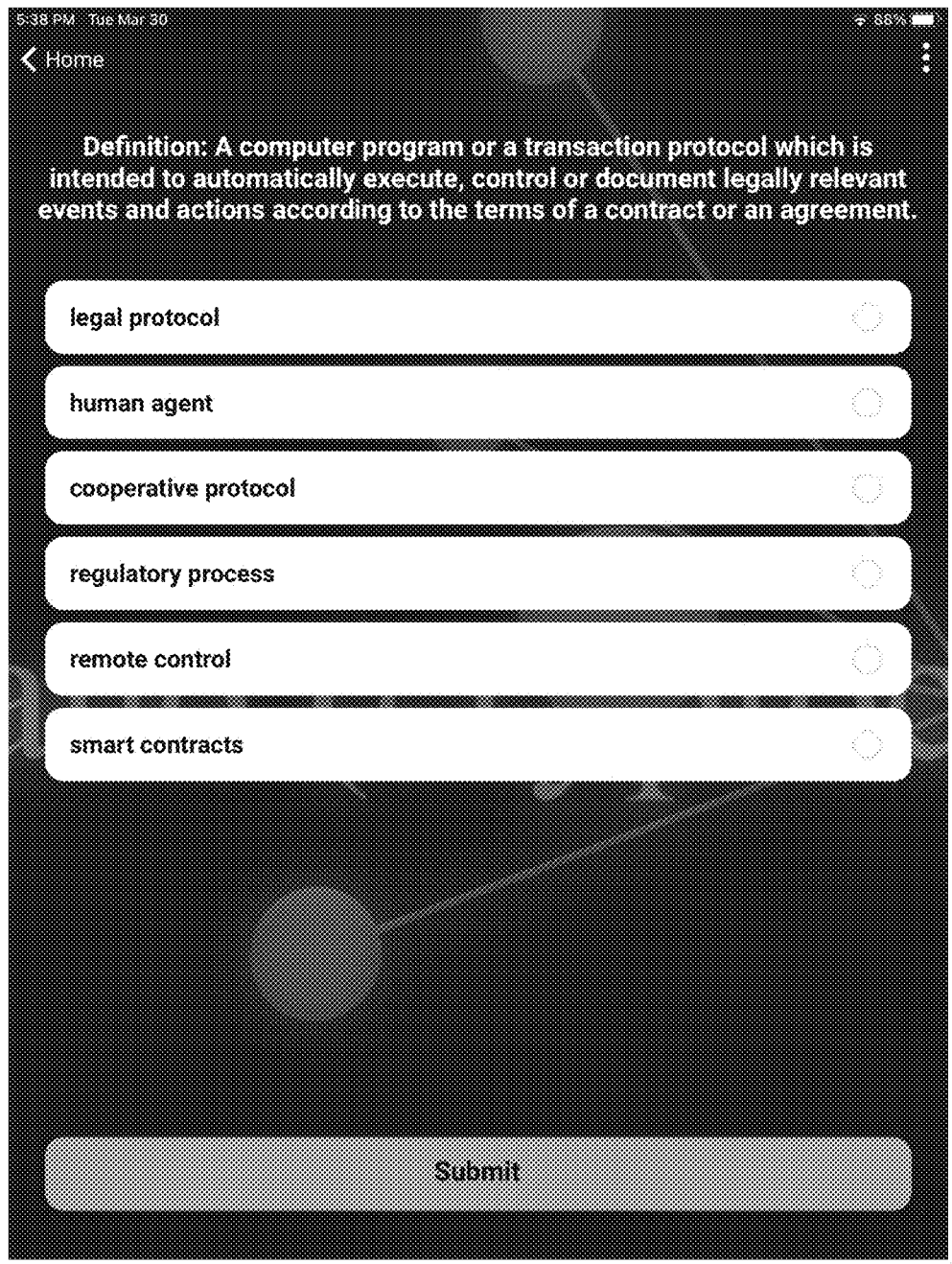
FIG. 8 illustrates a screen which shows an interaction generated by a learning system in accordance with a preferred embodiment of the present invention.

For example, FIG. 8 illustrates an interaction generated based on the key learning concept of "smart contracts". In the interaction, the definition of "smart contract" is shown to the user, and the user is prompted to select the term that the user believes corresponds to the definition from among a list of terms that include the correct answer (smart contracts) and other terms that corresponds to distractors which are incorrect answer choices. The definition based on which the interaction was generated was created based on the creation functionality discussed above in response the user inputting a desired topic. For example, the user typed the desired topic of "Cardano" into the search bar 602 and then selected "Cardano (cryptocurrency platform)" from the list of options displayed to the user, and as a result, the interaction was generated. Preferably, the distractors included in the interaction are generated based one or more of the processes discussed above.

In a preferred embodiment of the present invention, a question and answer multiple select interaction can also be generated using the key learnable concept and/or the distractors. For example, in this interaction, the user is presented with a question and two or more answer choices, wherein one or more of the answer choices are correct answers to the question. For example, the correct answer choices are based on the key learnable concept and the incorrect answers correspond to distractors. The user is prompted to select one or more answer choices, and after the selections are submitted by the user, the user is informed whether or not the user chose correct answer choices.

In a preferred embodiment of the present invention, an instructional content interaction can be generated based on the key learnable concept. For example, the user is presented with text, image, video, and/or audio content that provides information to the user regarding the key learnable concept, and the user is prompted to read, view, and/or listen to the content, for example.

In a preferred embodiment of the present invention, an image region selection interaction can be generated based on the key learnable concept. For example, the user is presented with an image and prompted to select a particular region within the image (e.g., by clicking on the particular region of the image on the I/O interface 230/240). Preferably, regions are defined by squares, circles, or custom polygons that represent a subsection of the image. After the user has selected a region of the image that the user believes the user is being prompted to select, the user is informed whether or not the user has correctly selected the region of the image.

In a preferred embodiment of the present invention, a fill-in-the-blank interaction can be generated based on the key learnable concept. In this interaction, the user is presented with a paragraph of text that has one or more words from the original paragraph replaced with underline characters. For example, the one or more words replaced with underline characters can correspond to the key learnable concept. The user is prompted to input the words that the user believes appear in the original paragraph to submit the user's response. After the user has submitted the response, the user is informed whether or not the user has entered the expected original word(s) from the paragraph that were replaced with the underlined characters.

In a preferred embodiment of the present invention, a sequential ordering interaction can be generated based on the key learnable concept. In this interaction, the user is presented with a list of items that can include text, image, video, and/or audio. The user is prompted to arrange the list of items in a particular order. For example, the user can drag and drop the items to change the order of the items included in the list, or the user can click an up/down button to change the order of the items included in the list. When the user believes that the order of the items included in the list is correct, the user submits the list, and the user is then informed whether or not the order meets the correct order of the items included in the list.

In a preferred embodiment of the present invention, a rating interaction can be generated based on the key learnable concept. In this interaction, the user is presented with text, image, video and/or audio content and is prompted to pick a numeric value representing how strongly the user agrees or disagrees with the content. Preferably, the user is also asked to provide a text response with the user's numeric value. The user is informed that the user's response has been received and may be sent a summary of the numeric value of other user's responses.

Referring back to FIG. 5, in block 512, the interactions generated in block 510 are connected to their corresponding key learnable concept, and the key learnable concepts and interactions are connected to a new topic. Preferably, each of the plurality of interactions is associated with only a single key learnable concept, but each key learnable concept may have a plurality of interactions. The new topic is able to include a plurality of key learnable concepts, and each key learnable concept is able to be associated with a plurality of topics.

In a preferred embodiment of the present invention, when a new topic has been generated, the new topic is connected to the other topics in a user's knowledge mesh in block 514 using NLP. Preferably, the new topic is connected to the other topics in a user's knowledge mesh in a sequential manner and according to a visual topic connection algorithm, as discussed in more detail below.

In a preferred embodiment of the present invention, the inputs to the visual topic connection algorithm include (1) a set of N existing topics S={T1, T2 ... TN} that correspond to topic nodes that the user has currently displayed on the user knowledge mesh, which may be empty for a new user; (2) a set of connections between the existing topics E={$C_{T1,T2}$, $C_{T1,T3}$ ... $C_{TM,TN}$}; (3) a pair of connection density parameters i and j, wherein i and j are integer values greater than 2, i is less than j, and the values of i and j may be hardcoded in advance or may depend on the number of topics in the user knowledge mesh such that one or both is greater when the number of topics in the user knowledge mesh is greater; (4) the new topic $T_0$ to be added to the user knowledge mesh.

Figure 9:
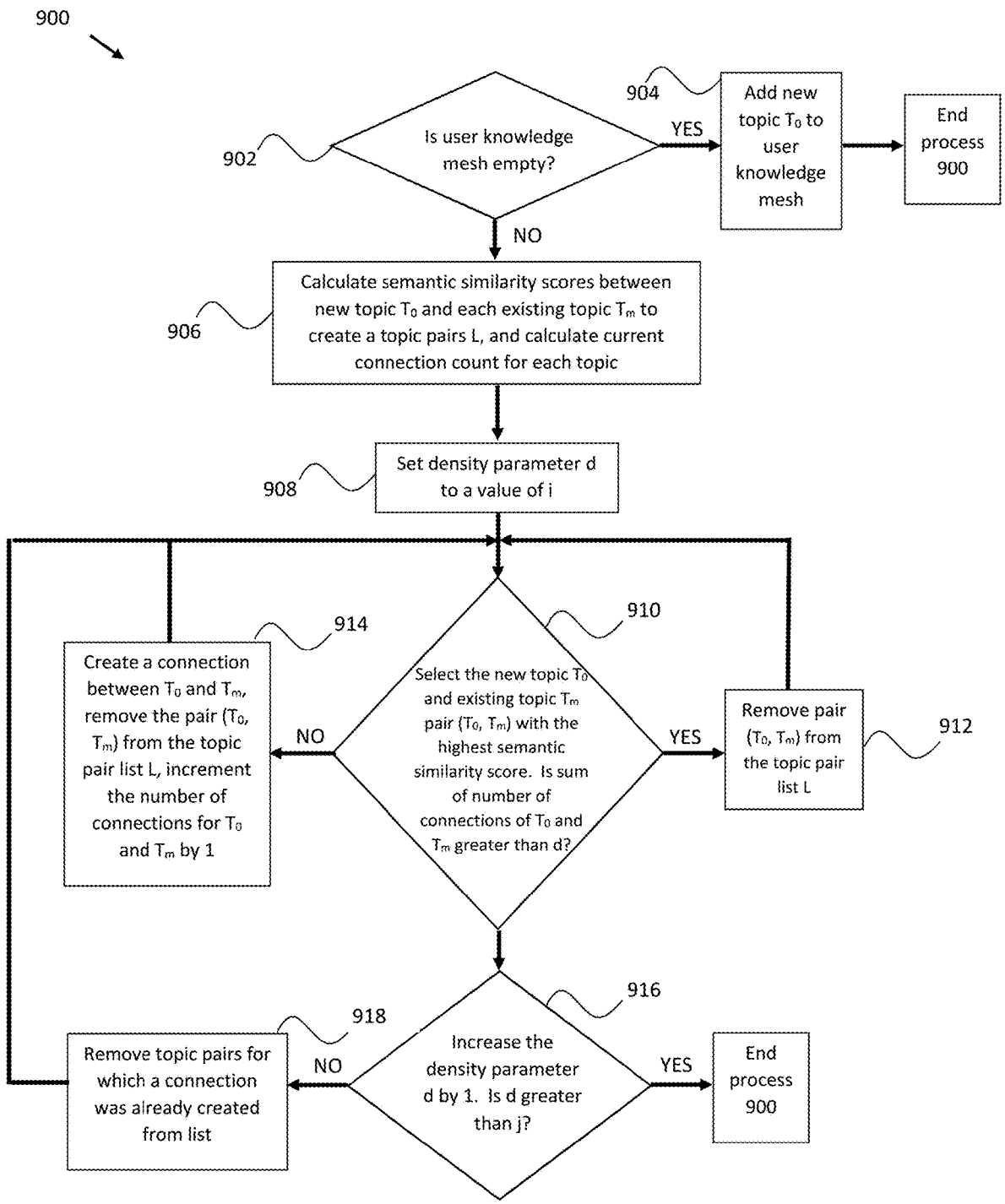
FIG. 9 illustrates processes for connecting a new topic to other topics that already exist in the user knowledge mesh performed by a learning system in accordance with a preferred embodiment of the present invention.

The process of connecting the new topic $T_0$ to the other topics in a user's knowledge mesh is discussed below with respect the process 900 shown in FIG. 9.

In a preferred embodiment of the present invention, the first step is to check the user knowledge mesh to determine whether or not the user knowledge mesh is empty (block 902). If, in block 902, it is determined that the user knowledge mesh is empty, the new topic $T_0$ (i.e., a new topic node that corresponds to the new topic $T_0$) is added to the user knowledge mesh (block 904) and the process ends. If, in block 902, it is determined that the user knowledge mesh is not empty, the process proceeds to block 906.

In block 906, a semantic similarity between the new topic $T_0$ and each of the topics $T_m$ that already exist in the user's knowledge mesh is determined (i.e., semantic similarities are determined for each ($T_0,T_m$) topic pair). In a preferred embodiment of the present invention, the semantic similarity between two topics can be represented by a semantic similarity score. For example, in block 906, a semantic similarity score between the new topic $T_0$ and each of the topics $T_m$ that already exist in the user's knowledge mesh is calculated (i.e., semantic similarity scores are calculated for each ($T_0,T_m$) topic pair). These semantic similarity scores are used to create a topic pairs list L that is ordered from the topic pair ($T_0,T_m$) with the highest semantic similarity to the topic pair ($T_0,T_m$) with the lowest semantic similarity. In block 906, the number of connections for each of the topics is also determined.

In a preferred embodiment of the present invention, the semantic similarity between two topics can be represented by a semantic similarity score that is calculated using NLP processes such as keyword matching across the key learnable concepts, interactions (e.g., quizzes), and/or source materials included in the two topics, and/or more sophisticated semantic and deep learning NLP models discussed in more detail below.

In a preferred embodiment of the present invention, the learning system includes an API endpoint that receives the two topics and the interactions of the two topics as inputs, and the API endpoint uses NLP techniques to calculate and return the semantic similarity score for the pair of topics. As an example, a new topic of "Data Structures in Python" would have a stronger semantic similarity to the existing topic of "Object-oriented Programming" than to an existing topic of "Pipetting and Dispensing".

In a preferred embodiment of the present invention, the learning system is able to a calculate semantic similarity between topics using one or more different techniques/approaches. For example, the techniques/approaches for calculating topic semantic similarity include: (1) Jaccard or TF-IDF cosine similarity, (2) Knowledge base measures, and (3) embedding similarity. The faster and more efficient method may involve using the Jaccard or TF-IDF cosine similarity and a more semantic approach would involve calculating the cosine similarity between the topic embeddings, which is inferred from either the word embeddings or transformer models.

For the Jaccard or TF-IDF cosine similarity approach, the learning system performs part-of-speech (POS) tagging using an NLP POS tagger on the items included in the interactions of each topic. Then the key learnable concepts are extracted and multi-token concepts are identified by chunking together words with similar POS tags within a defined window that is determined by the maximum phrase length of a key learnable concept that is desirable to extract. Alternatively, the one or more key learnable concepts connected to a topic can be searched from a database cache of the learning system.

Once the one or more key learnable concepts for the topics have been extracted, the Jaccard similarity, which is the intersection over the union of the one or more concepts between the topics can be calculated. For example, the topics can be converted to a vector space with TF-IDF vectors or advanced word/transformer embedding vectors. Then, calculating the average cosine similarity between the concept vectors gives the connection strength between the various topics.

For the knowledge base approach, a knowledge base is used to quantify the semantic relatedness of words associated with the topics such as the key learnable concepts, interactions (e.g., quizzes), and/or source materials included in the topics. Preferably, quantifying the semantic relatedness of these words includes use of a lexical database of semantic relations between words such as Wordnet. Wordnet is a large lexical database of English in which nouns, verbs, adjectives and adverbs are grouped into sets of cognitive synonyms (synsets), each expressing a distinct concept. Synsets are interlinked by conceptual-semantic and lexical relations. WordNet superficially resembles a thesaurus, in that it groups words together based on their meanings, however, WordNet interlinks not just word forms—strings of letters—but specific senses of words. A word sense is one of the meanings of a word (some words have multiple meanings, some words have only one meaning). As a result, words that are found in close proximity to one another in the network are semantically disambiguated. Additionally, WordNet labels the semantic relations among words, whereas the groupings of words in a thesaurus does not follow any explicit pattern other than meaning similarity. Using a hypernym/hyponym taxonomy via Wordnet, a path similarity is calculated, which is the shortest path between the word senses of each word in each topic. The average similarity across all words in each topic provides the connection strength between the given set of topics.

For the embedding similarity approach, the learning system uses a transformer based deep learning NLP model such as BERT (Bidirectional Encoder Representations from Transformers) or USE (Universal Sentence Encoder) to calculate sentence embeddings for each topic. The transformer architecture includes a mechanism called "self-attention", which prioritizes the most semantically important words present in a sentence. For example, the BERT transformer model has twelve (12) such layers of attention, is able to learn and retain text's long-term dependencies, encode the text's bidirectional context, and is able to process vocabulary words. The BERT model then calculates pairwise cosine similarity between each topic embedding and returns a similarity matrix.

In yet another approach to calculate semantic similarity between topics, the learning system is able to use the Wikipedia page links to determine the strength of the connection between the topics. For example, the learning system is able to access a pair of Wikipedia pages, e.g., page A and page B. For page A, the learning system is able to determine the pages that are linked within page A (i.e., internal links) and the pages that are linked to page A (i.e., backlinks). By determining the internal links and the backlinks of page A, the system is able to construct a graph that connects all of the Wikipedia pages stored in the learning system. If page B is included in the list of internal links or backlinks of page A, then the system determines that the connection between page A and page B is strong. If page B is not included in the list of internal links or backlinks of page A, the page connection strength between page A and page B can be determined by normalizing the number of hops required to reach page B from page A (e.g., the number of intermediate pages needed to reach page B from page A through internal links or backlinks of the intermediate pages).

Once a semantic similarity score for the connection between the new topic To and each of the topics that already exist in the user's knowledge mesh has been calculated in block 906, the process proceeds to block 908.

In block 908, a density parameter d is set to a value of i, and the process proceeds to block 910. In block 910, the topic pair $(T_0,T_m)$ with the highest semantic similarity score from the topic pair list L is selected, and the number of connections for the new topic $T_0$ and the number of connections for the existing topic $T_m$ are added together to calculate a sum of the connections for the new topic $T_0$ and the existing topic $T_m$.

If, in block 910, the sum of connections calculated is greater than the density parameter d (YES in block 910), the topic pair $(T_0,T_m)$ is removed from the topic pair list L in block 912 and the process proceeds back to block 910 to select a new topic pair. On the other hand, if the sum of connections calculated is less than or equal to the density parameter d in block 910 (NO in block 910), a connection between the new topic $T_0$ and the existing topic $T_m$ of the topic pair $(T_0,T_m)$ is created in the user's knowledge mesh (i.e., a topic node corresponding to the new topic $T_0$ is connected to the topic node of the existing topic $T_m$) and the topic pair $(T_0,T_m)$ is removed from the topic pairs list L in block 914. In block 914, the number of connections for each of the new topic $T_0$ and the existing topic $T_m$ is increased by 1, after which the process returns to block 910 to select a new topic pair.

If, in block 910, the topic pair list L is empty, the process proceeds to block 916. In block 916, the density parameter d in increased by 1. If the density parameter d is greater than j (YES in block 916), the process 900 is ended. On the other hand, if the density parameter d is not greater than j (NO in block 916), the process proceeds to block 918. In block 918, the topics pairs for which a connection have already been made are removed from the original topic pairs list L created in block 906, and the process returns to block 910.

In a preferred embodiment of the present invention, the learning system determines whether or not the user knowledge mesh is completely connected, i.e., any concept node on the knowledge mesh can be traveled to by any other concept node on the knowledge mesh, as discussed in more detail below. If the learning system determines that the knowledge mesh is not completely connected, additional topic connections are made until the knowledge mesh is completely connected.

In a preferred embodiment of the present invention discussed above, each new topic added to the user knowledge mesh is connected to the other topics in the user knowledge mesh in a sequential manner (i.e., as each new topic is created). However, the learning system is also able to refresh the entire user knowledge mesh by deleting all existing connections between topics and creating new connections between topics, which may result in more accurate connections than the connections previously made using the sequential approach discussed above. For example, the sequential approach discussed above does not guarantee that two very semantically similar topics will be connected. More specifically, if, for example, 100 new topics were sequentially added to the knowledge mesh, and the first newly added topic and last newly added topics were closely related, by the time the last newly added topic (i.e., the 100th new topic) is added to the user knowledge mesh the first newly added topic may have already reached its maximum number of connections, and therefore, the first newly added topic would not be connected with the last newly added topic.

In a preferred embodiment of the present invention, a non-sequential approach to connecting the topics included in the user knowledge mesh can be executed via the refresh of the user knowledge mesh discussed above. In a refresh of the user knowledge mesh, all existing connections between topics are deleted such that all topics are immediately available to connect with other topics and the connections between topics are added in descending order of semantic similarity so as to guarantee that the topics that are most semantically related are connected with each other.

In a preferred embodiment of the present invention, the refresh of the knowledge mesh is able to be prompted, for example, by a user action such as logging into the learning system application, logging out of the learning system application, pressing a button labeled "refresh" or "rebuild", or adding a certain number of new topics to the knowledge mesh. Preferably, the refresh of the knowledge mesh can be run on a schedule at times of low demand on the computing resources of the learning system.

Figure 10:
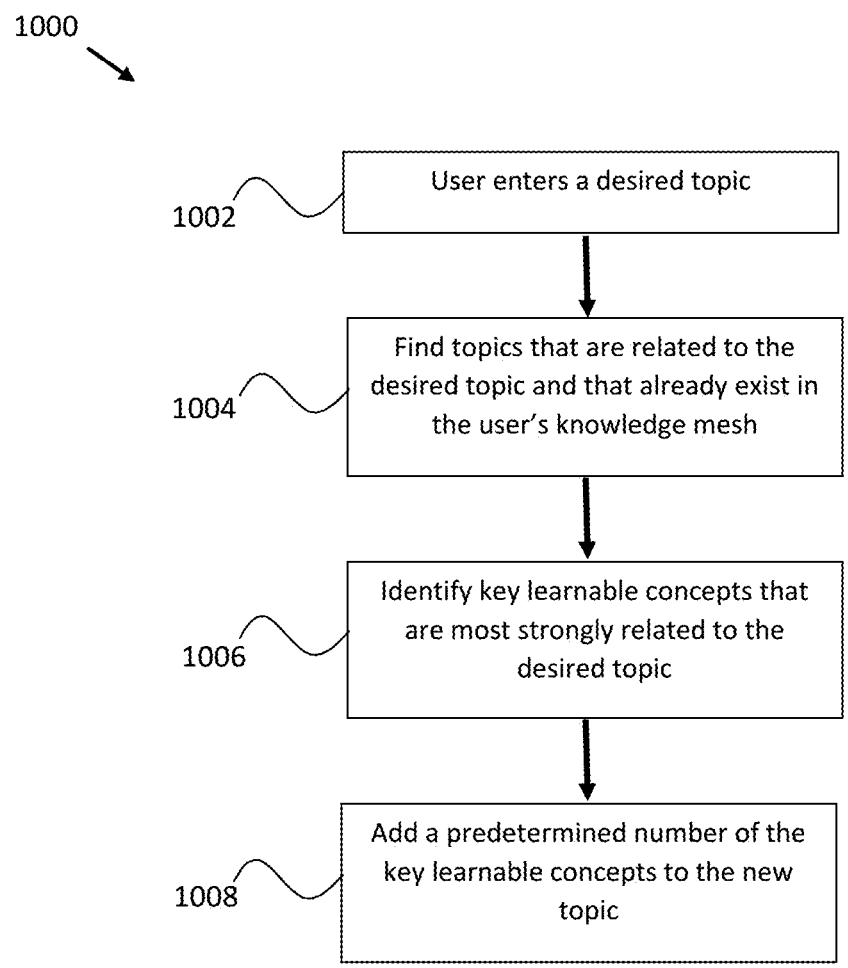
FIG. 10 illustrates processes for creating a new topic based on key learnable concepts and topics that already exist in the user knowledge mesh performed by a learning system in accordance with a preferred embodiment of the present invention.

In a preferred embodiment of the present invention, the learning system includes an alternative approach to creating a new topic. More specifically, a new topic can be created based on key learning concepts and topics that already exist in the user's knowledge mesh, as discussed in detail below with respect to the process 1000 shown in FIG. 10.

In block 1002, a user enters a desired topic. The desired topic can include, for example, language that indicates the content of the desired topic. For example, a user may type out "I want to learn about Aristophanes, and especially how his poetry differed from his contemporaries in Ancient Greece".

In block 1004, the learning system identifies/finds topics that are related to the desired topic and that already exist in the user's knowledge mesh based on semantic similarity scores between the users desired topic and topics that already exist in the user's knowledge mesh. Then, in block 1006, the one or more key learnable concepts for the topics found in block 1004 that are most strongly related (semantically related) to the new, desired topic are identified based on semantic similarly score calculations. In block 1008, a predetermined number of the key learnable concepts and the interactions related to the key learnable concepts found in block 1006 are added to the new topic to create the new topic.

Figure 11:
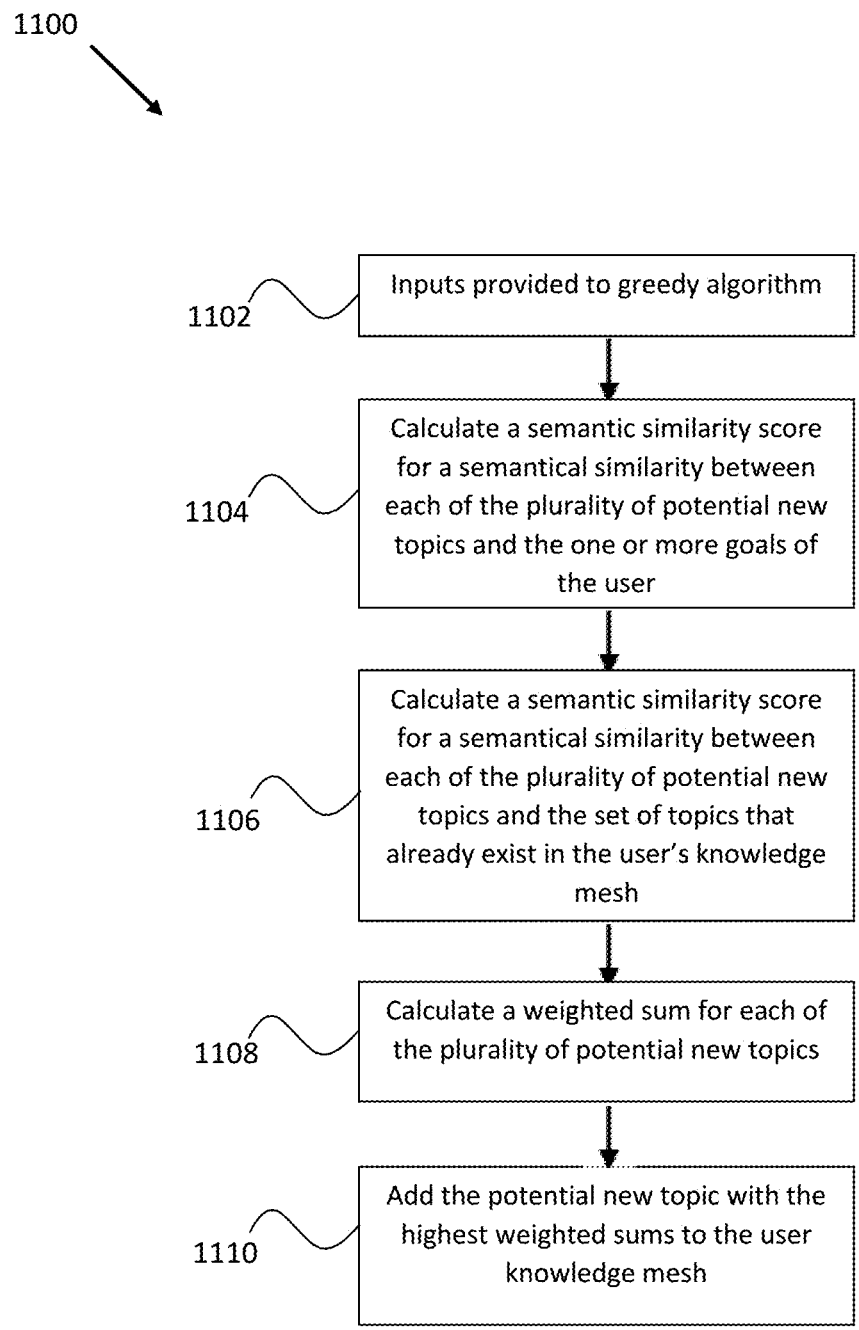
FIG. 11 illustrates processes for creating new topics and key learnable concepts using a greedy algorithm in accordance with a preferred embodiment of the present invention.

In a preferred embodiment of the present invention, a new topic is created based on topics and key learnable concepts that already exist in the user's knowledge mesh based on a process that uses a greedy algorithm. The greedy algorithm sequentially adds new topics and key learnable concepts to the user's knowledge mesh in a manner that the new topics and key learnable concepts maximize overlap with one or more goals of the user's (e.g., the user's desired knowledge stated in plain language or inferred from some source material such as an exam) but minimizes overlap with topics and key learnable concepts that already exist in the user's knowledge mesh. The process of creating new topics and key learnable concepts using the greedy algorithm is discussed below in accordance with the process 1100 shown in FIG. 11.

In block 1102, the greedy algorithm is provided with a set of topics that already exist in a user's knowledge mesh, one or more goals of the user (e.g. written in plain English or defined by some source material), and a plurality of potential new topics that are stored in the learning system (e.g., memory 214 and/or memory 236/246) but that are not included in the user's knowledge mesh.

In block 1104, for each of the plurality of potential new topics, a semantic similarity score between the potential new topic and the one or more goals of the user is calculated. In block 1106, for each of the plurality of potential new topics, a semantic similarity score between the potential new topic and the set of topics that already exist in the user's knowledge mesh is calculated.

Next, in block 1108, for each of the plurality of potential new topics, a weighted sum is calculated in which the semantic similarity score between the potential new topic and the one or more goals of the user is added and the semantic similarity score between the potential new topic and the set of topics that already exist in the user's knowledge mesh is subtracted.

In a preferred embodiment of the present invention, the weight of the semantic similarity score between the potential new topic and the one or more goals of the user can be adjusted to control how closely centered around the one or more goals of the user the new topics will be. Additionally, the weight of the semantic similarity score between the potential new topic and the set of topics that already exist in the user's knowledge mesh can be adjusted to control how similar to other topics that already exist in the user's knowledge mesh a newly added topic can be, for example, to reduce the probability that a new topic overlaps with an existing topic in the user's knowledge mesh.

In step 1110, based on the weighted sums calculated for each of the new potential topics, a new topic is added to the user's knowledge mesh. For example, the new potential topic with the highest weighted sum is added to the topics of the user's knowledge mesh. In a preferred embodiment of the present invention, block 1104 through block 1110 can be repeated based on the new set of topics included in the user's knowledge mesh in order to create additional new topics.

In the manner discussed above, the greedy algorithm adds new topics to the user's knowledge mesh in such a way that the topics added to the user's knowledge mesh are relevant to the one or more goals of the user while simultaneously reducing or minimizing the semantic overlap between the newly added topics and the topics that already exist in the user's knowledge mesh. Additionally, the ability to adjust the weight of the semantic similarity score between the potential new topic and the one or more goals of the user can be used to control how closely the one or more newly added topics are to the one or more goals of the user, and the ability to adjust the weight of the semantic similarity score between the potential new topic and the set of topics that already exist in the user's knowledge mesh can be used to control how closely the one or more newly added topics are to the topics that already exist in the user's knowledge mesh (i.e., how acceptable it is to have two similar topics in the user's knowledge mesh).

In a preferred embodiment of the present invention, the topics and key learning concepts that already exist in the user's knowledge mesh and are used to create a new topic can be selected based on a measure of concept quality. The concept quality of a topic and key learnable concept can be based on a quality of the one or more interactions related to the key learnable concept. The quality of an interaction can be measured through a weighted combination of one or more of the following metrics: (1) how often a user that encounters the interaction deletes the interaction from the user's knowledge mesh, which negatively impacts the quality of the interaction; (2) the number of times on average a user chooses to interact with the interaction; (3) how often a user chooses the interaction or the topic that the interaction is included in as a starting point on the user's knowledge mesh; (4) how often a user chooses to share the interaction or the topic that that interaction is included in with other users of the learning system; (5) whether or not the interaction has been edited by a user; (6) how often the interaction has been flagged for inaccuracy by a user, which negatively impacts the quality of the interaction; (7) natural language processing measures of fluency, perplexity, reading grade level, or other similar metrics; (8) a question quality score calculated by the system at the moment of creation; (9) a length of the interaction and answer to the interaction; (10) a position of the interaction within an article; and (11) a frequency and a rank of the concept from a keyword graph.

With respect to metric (7) discussed above, in a preferred embodiment of the present invention, perplexity measures the possibility of the occurrence of a distribution of words (a sentence), with a higher value denoting increased randomness. By ranking interactions such as quiz questions by increasing perplexity, the system can ensure that topics and key learnable concepts that include higher quality interactions are selected. In a preferred embodiment of the present invention, a content quality metric for an interaction can based on Flesch Reading Ease. The Flesch Reading Ease gives a text a score between 1 and 100, with 100 being the highest readability score. By ranking interactions such as quiz questions by increasing Flesch Reading Ease, the system can ensure higher quality items are created.

In a preferred embodiment of the present invention, the concept quality of a topic or key learnable concept can be defined as the average of the quality of the one or more interactions of the key learnable concept.

In a preferred embodiment of the present invention, the quality of an interaction can also be based on the distractors of the interaction in the case that the interaction is a quiz question that includes distractors as answer choices (e.g., a multiple-choice quiz question). For a multiple-choice quiz question for which there is a single correct answer and N incorrect answers (distractors), the learning system is able to calculate a readiness score, discussed in more detail below, which corresponds to the probability P that the user will answer the quiz question correctly. Thus, the probability that the user will select one of the incorrect answers (i.e., any one of the distractors) corresponds to 1−P.

In a preferred embodiment of the present invention, a distractor is considered a good quality distractor if, when an incorrect answer choice is selected, it is approximately equally likely to be picked compared to the other incorrect answer choices (distractors). In contrast, if a distractor is almost always chosen, the distractor is considered a poor quality distractor because it is confusing. Similarly, if the distractor is almost never chosen, the distractor is considered to be a poor quality distractor because it is too obviously an incorrect answer choice.

Thus, in a preferred embodiment of the present invention, an ideal selection rate for each distractor corresponds to (1−P)/N, wherein N is the number of incorrect answer choices (distractors). Therefore, the statistical deviance from this distribution, for example, by calculation of a Chi statistic or a log-likelihood, defines the quality of the interaction according to the distractors which can be calculated using actual user responses to the interaction.

For example, an interaction that is a multiple-choice question may ask: "What language is the following: "Comment ca va?"" wherein the correct answer choice is French, and the distractors (incorrect answer choices) are Spanish, German, and Potato. In this example, the distractors of Spanish and Potato are liable to score low because of more and less frequent selection, respectively, than the ideal value of (1−P)/N. In contrast, if the distractors are instead: Spanish, German, and Italian, the average selection rate of each distractor will be closer to (1−P)/N and the interaction will thus have a higher quality.

In a preferred embodiment of the present invention, the quality of the interaction can change over time as more users interact with the interaction. Furthermore, if the quality of an interaction is below a quality threshold, the interaction can automatically be improved, for example, by exchanging one or more distractors of poor quality. For example, in the example discussed above, the distractor of Potato can automatically be exchanged for Italian to improve the quality of the interaction by improving the distractors.

Referring back to FIG. 5, in preferred embodiments of the present invention discussed above, if it is determined that the desired topic input by the user does not exist in the learning system (NO in block 504), the system conducts a search for the user's search string in an open source dataset such as Wikipedia, via an API call to wikipedia.org to find a related page of the form "en.wikipedia.org/wiki/<topic_string>", for example. However, in a preferred embodiment of the present invention, the learning system is able to access a different set of text or other content from which to create key learnable concepts, as discussed in more detail below.

In a preferred embodiment of the present invention, a user is able to select a document (e.g., a pdf, Word, or text document), video file, image file, or audio file and upload the same to the learning system. The learning system uses artificial intelligence to read the document or file and generate key learnable concepts and related interactions (e.g., quiz questions).

In a preferred embodiment of the present invention, a user is able to use a camera and/or scanner to capture an image of a document. The image can be uploaded to the learning system and optical character recognition (OCR) is used to extract text from the image. In some preferred embodiments, computer vision may be used to identify and label images within the image of the document.

In a preferred embodiment of the present invention, a user is able to use a camera and/or scanner to capture an image of a document, a user inputs a topic and a URL for a website. The learning system makes an API call to the provided URL for the website and extracts the body of text from the html for the URL.

In a preferred embodiment of the present invention, in the process of learning a key learnable concept using the user's knowledge mesh, the user is able to select from a dropdown menu "Create a topic about this", prompting the creation functionality discussed above to be run on a Wikipedia page most closely related to the key learnable concept being learned.

In a preferred embodiment of the present invention, a user is able to use a web browser extension to generate one or more key learnable concepts and related interactions. More specifically, while using a web browser with the browser extension installed, the user can select parts of the website (e.g., text, images, video, sound) and the browser extension will capture the selection and generate one or more key learnable concepts, based on the key learnable concepts extracted from the selected parts of the website. For example, a user with the browser extension installed may select a term of interest, right click, and select a button from a dropdown menu, prompting the creation of a fill-in-the-blank quiz question based on the chosen term.

In a preferred embodiment of the present invention, a user to able to use an API to provide the learning system with text, image, video, and/or audio content. Artificial intelligence processes of the learning system will connect to the API to retrieve the text, image, video, and/or audio content and then generate one or more interactions such as quiz questions items from the content.

In a preferred embodiment of the present invention, the learning system is able to access a different set of text or other content from which to create key learnable concepts using a third-party product integration, as discussed in more detail below. For example, while using a third-party product including a video conferencing and teleconferencing platforms and applications such as Zoom, Microsoft Teams, or Google Meet Up, the user can click a button which will feed text, image, video, and/or audio content from the third-party product to the learning system. Examples of this process are described in U.S. Provisional Application 63/073,749, entitled "PERSONALIZED LEARNING SYSTEM AND INTEGRATION OF THE SAME WITH VIDEOCONFERENCING AND TELECONFERENCING PLATFORMS AND APPLICATIONS," filed Sep. 2, 2020, which is hereby incorporated herein by reference in its entirety. A preferred embodiment of the present invention in which the learning system accesses a set of text or other content from which to create key learnable concepts using a third-party product integration is discussed in detail below with respect to FIG. 1.

In a preferred embodiment of the present invention, a user can use the user device 108 to identify content 112 of a meeting (e.g., a meeting being conducted using a third-party product such as Zoom, Microsoft Teams, or Google Meet Up) to be received by the content editor 102. For example, the user can use the user device 108 during or after the meeting to identify content 112 of the meeting to be received by the content editor 102.

In a preferred embodiment of the present invention, the user device 108 is able to receive an input from the user that identifies a particular point in time during the meeting. For example, the user device 108 can include a button (e.g., a hard key or a soft key) that can be activated or pressed by the user in order to identify a particular point in time during the meeting.

When the input that identifies the particular point in time during the meeting is received by the user device 108, a predetermined amount of content of the meeting from prior to the input being received is identified as the content 112 to be received by the content editor 102. For instance, in an example in which the input is a button included on the user device 108, a predetermined amount of content of the meeting from prior to the button being pressed is identified as the content 112 to be received by the content editor 102.

The predetermined amount of content of the meeting identified as the content 112 to be received by the content editor 102 can correspond to the content of the meeting from a predetermined period of time before the button was pressed (e.g., the content of the meeting from the 20 seconds or 30 seconds of the meeting before the button was pressed), for example. The predetermined amount of content of the meeting identified as the content 112 to be received by the content editor 102 can also correspond to the content of the meeting from a predetermined number of the most recently presented slides of a lecture presentation before the button was pressed or the content of the meeting discussed in a predetermined number of the most recently spoken sentences of a conversation before the button was pressed, for example.

In a preferred embodiment of the present invention, one or more key learnable concepts can be identified based on the content 112 received by the content editor 102. In an example in which the meeting is a lecture, the key learnable concept may correspond to a particular fact or piece of information identified by the user using the input of the user 108, and related key learnable concepts that relate to the particular fact or piece of information. In this manner, the learning system is able to generate key learnable concepts that are related to the particular key learnable concept identified by the user.

Figure 12:
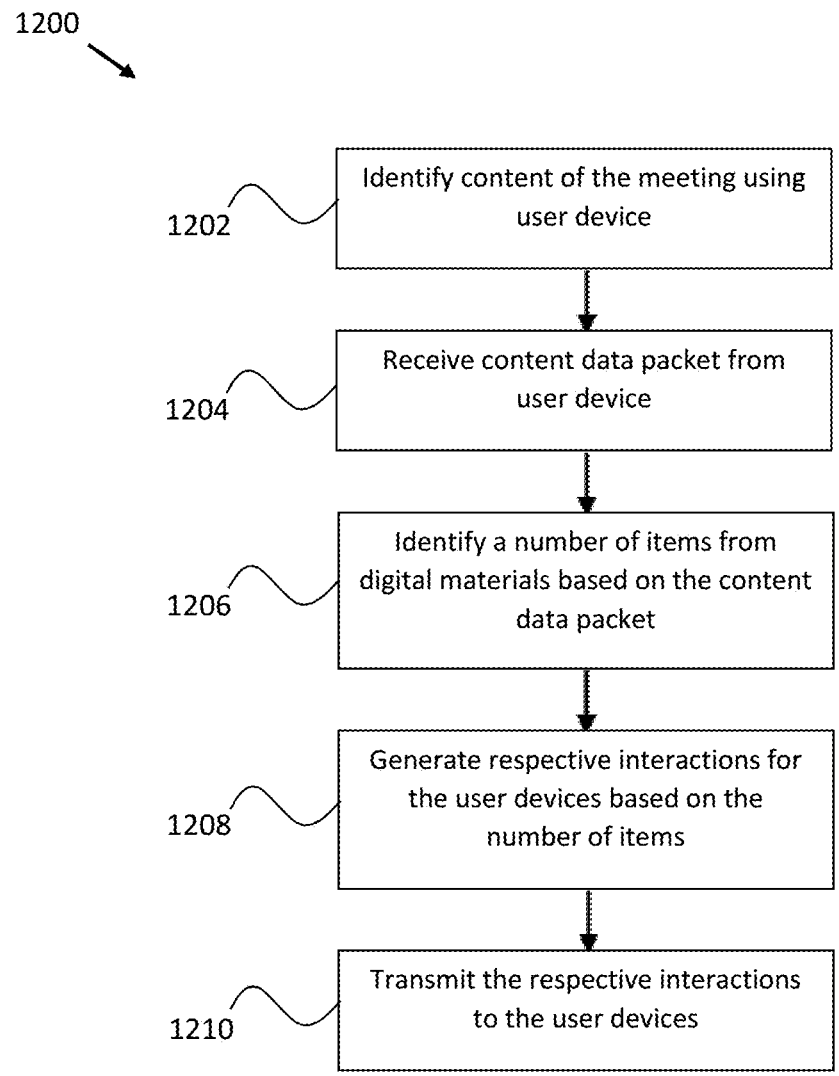
FIG. 12 illustrates processes performed by a learning system in accordance with a preferred embodiment of the present invention.

Referring now to FIG. 12, blocks 1202-1210 of process 1200 may be performed by a preferred embodiment of the learning system described herein, where the learning system may interact with user devices 108. In block 1202, content of the meeting is identified using the user device. For example, a user uses the user device 108 to identify content 112 of the meeting to be received by the content editor 102. In the example discussed above in which the user device 108 includes a button that identifies a particular point in time during the meeting and a predetermined amount of content of the meeting from prior to the button being pressed is identified as the content 112 to be received by the content editor 102, the user can use the button during the meeting to identify content of the meeting that the user deems important. More specifically, the user can activate or press the button during a meeting if the user identifies a key learnable concept, which may be a concept that the user would like to learn additional information about, or a concept, fact, or information that the user does not fully understand (e.g., terminology being used during the meeting that is unfamiliar to the user). In this manner, the user can use the input (e.g., the button) of the user device to quickly identify and bookmark content of the meeting while the meeting is ongoing, which prevents or significantly reduces the need for the user to take the time, effort, and focus to actively take note of this content during the meeting.

As discussed above, the predetermined amount of content of the meeting identified as the content 112 to be received by the content editor 102 can correspond to the content of the meeting from a predetermined period of time before the button was pressed. For example, the predetermined amount of content of the meeting identified as the content 112 to be received by the content editor 102 can correspond to the content of the meeting from the 20 seconds of the meeting before the button was pressed. Thus, the user is able to identify the content of meeting from, for example, the most recent 20 seconds or 30 seconds of the meeting as content 112 to be received by the content editor 102 by pressing the button.

In a preferred embodiment of the present invention, the content 112 may be a content data packet that includes text from a live transcription of the previous 20 seconds of the meeting. The content 112 can also include text, slides, figures, images, videos, and/or additional audio content discussed or displayed in the previous 20 seconds of the meeting, for example.

In a preferred embodiment of the present invention, the content 112 is received by the content editor 102 as the meeting is ongoing. For example, the text of the live transcript that corresponds to the previous 20 seconds of the meeting is sent to the content editor 102 in response to the button being pressed during the meeting. Thus, the content 112 received by the content editor 102 can be processed and used to provide interactions to the user as the meeting is still ongoing, as discussed in more detail below.

In a preferred embodiment of the present invention, the input received by the user device 108 (e.g., the button on the user device) creates a time stamp that identifies a particular point in time during the meeting, and the video and/or audio of the meeting is processed by a transcription service after the meeting has ended. In this preferred embodiment, the location of the time stamp can be identified within the completed transcript of the meeting, and then the content of the meeting including the text of the transcript that corresponds to the 20 seconds of meeting before the button was pressed can be used as the content 112 received by the content editor 102, for example.

In block 1204, the learning system receives content data packets from the one or more user devices, respectively. In block 1206, the learning system identifies a number of items from digital materials, such as multiple text books, a collection of portable document formats (PDFs), content images, multimedia videos, audio content, and/or other resources.

In block 1208, the learning system may generate respective interactions for the user devices, and in block 1210, the interactions are transmitted to the respective user devices. As discussed above, interactions are able to be generated based on the items identified in the content 112 received by the content editor 102, and are transmitted to the user device 108 in order for the user to respond to the interaction or have access to the information included in the interaction. For example, the interaction can be a multiple-choice question and/or a fill-in-the-blank question that is sent to the user device 108 after the meeting has ended. If the user uses the button on the user device 108 to identify a particular key learnable concept as the content 112 to be received by the content editor 102, then the interaction such as the multiple-choice question and/or a fill-in-the-blank question can be based on items identified as a result of the particular key learnable concept being identified as the content 112 to be received by the content editor 102.

In another example, the interaction 118 may provide information to the user, for example, using text, figures, images, videos, and/or audio contents during or after the meeting. For example, if during a meeting, the user uses the button on the user device 108 to identify terminology unfamiliar to the user, then the interaction can include a text box that displays the definitions of the terminology to the user, e.g., on a display of the user device. In this way, the user can learn the meaning of the terminology as the meeting is ongoing, which may help the user better follow or understand the contents of the meeting.

The learning system of the present preferred embodiment of the present invention can be integrated with video conferencing and teleconferencing platforms and applications such as Zoom, Microsoft Teams, or Google Meet Up, for example. In the above-described preferred embodiments of the present invention, the systems and methods disclosed enable a user to easily, selectively and automatically select content that the user desires to learn, retain and master, by simply activating or pressing a button one or more times during an ongoing videoconference. This minimizes effort, distraction, and cognitive load on the user during the videoconference.

Also, once the content has been selected by an individual user by simply activating or pressing the button, the systems and methods according to preferred embodiments of the present invention automatically generate content to be learned, and generate interactions presented by the adaptive engine 106 functioning and performing as a cloud-based personalized learning engine and/or artificial intelligence engine to generate the one or more interactions to enable the user to learn, remember and master the content selected by the meeting participant. This eliminates the difficult task and cognitive load on the user to try to determine how best to study content identified or highlighted during the videoconference, and also ensures that the user will learn, remember and master the customized, selected content.

In another preferred embodiment of the present invention, if the user/meeting participant does not activate the button on the user device 108 during the videoconference, the entire content 112 of the videoconference is received by the content editor 102, and the learning system generates and transmits interactions presented by the adaptive engine 106 functioning and performing as a cloud-based personalized learning engine and/or artificial intelligence engine to generate the one or more interactions to enable the user/meeting participant to learn, remember and master the content from the videoconference generated by the content editor 102, as described above and shown in FIG. 12.

In a preferred embodiment of the present invention, the learning system determines a readiness of a user with respect to a key learnable concept. The readiness of a user with respect to a key learnable concept is the probability that the individual user will be able to recognize or recall the key learnable concept at a specific moment in time. In a preferred embodiment of the present invention, the readiness of the user with respect to a key learnable concept is represented by a readiness score, as discussed in more detail below.

In a preferred embodiment of the present invention, the readiness score of an individual user with respect to a key learnable concept at the specific moment in time may be closely approximated by the following function:

$$\text{readiness} = \text{sigmoid}(c_3 A^3 + c_2 A^2 + c_1 A + c_0) + Q_{mod} + C_{mod} + U_{mod} + t_0 + t_1 \times \ln(R + t_2)$$

In the above function, $c_0$, $c_1$, $c_2$, $c_3$ and $t_0$, $t_1$, $t_2$ are constant values, ln represents the natural logarithm, R represents the number of reviews completed by the user for the key learnable concept, $Q_{mod}$ is a modifier offset based on a quiz difficulty (interaction difficulty), $C_{mod}$ is a modifier offset based on a concept difficulty, and $U_{mod}$ is a modifier offset based on a user agility, sigmoid represents a sigmoid function that maps a real valued variable to a range between 0-1, and A represents an interim knowledge state variable called activation A. The value output by the above function is on a 0-1 scale such that the value corresponds directly to a real-world probability that the user will be able to recognize or recall the key learnable concept. For example, a function value of 0.75 represents a real-world probability of 75% that the user will be able to recognize or recall the key learnable concept. In a preferred embodiment of the present invention, the real-world probability that the user will be able to recognize or recall the key learnable concept corresponds to the real-world probability that the user will be able to correctly answer an interaction related to the key learnable concept.

The constant values of $c_0$, $c_1$, $c_2$, $c_3$ and $t_0$, $t_1$, $t_2$ are empirically derived and are used to control the shapes that different readiness curves are able to take on.

In the above function, the activation value A is determined by an exponential decay model such as: $A = 0.5^{(age/H)}$. In this exponential decay model, age represents the amount of time since the key learnable concept was last encountered or reviewed by the user. In a preferred embodiment of the present invention, a timestamp that was taken when the user last input a response to an interaction related to the key learnable concept is used to calculate the value of age at the specific moment in time that the activation value A is calculated (i.e., when a readiness score in calculated). The half-life value H represents the current estimated half-life of the memory of the user with respect to the key learnable concept. The half-life value H represents a decay rate of the memory of the user with respect to the key learnable concept. In order to calculate the activation value A, the value of age and the half-life value H are expressed in a same unit.

The half-life value H of the memory of the user with respect to the key learnable concept determines the rate of decay in the readiness score over time (i.e., as the value of age increases). If a user has not yet been exposed to a key learnable concept, the half-life value H is set to an initial value. Preferably, the initial value for the half-life value H is determined empirically and reflects the general rate of memory decay observed for a newly learned concept. The initial value for the half-life value H can also be adjusted up or down depending on the past performance of the user for newly learned key learnable concepts.

Figure 13:
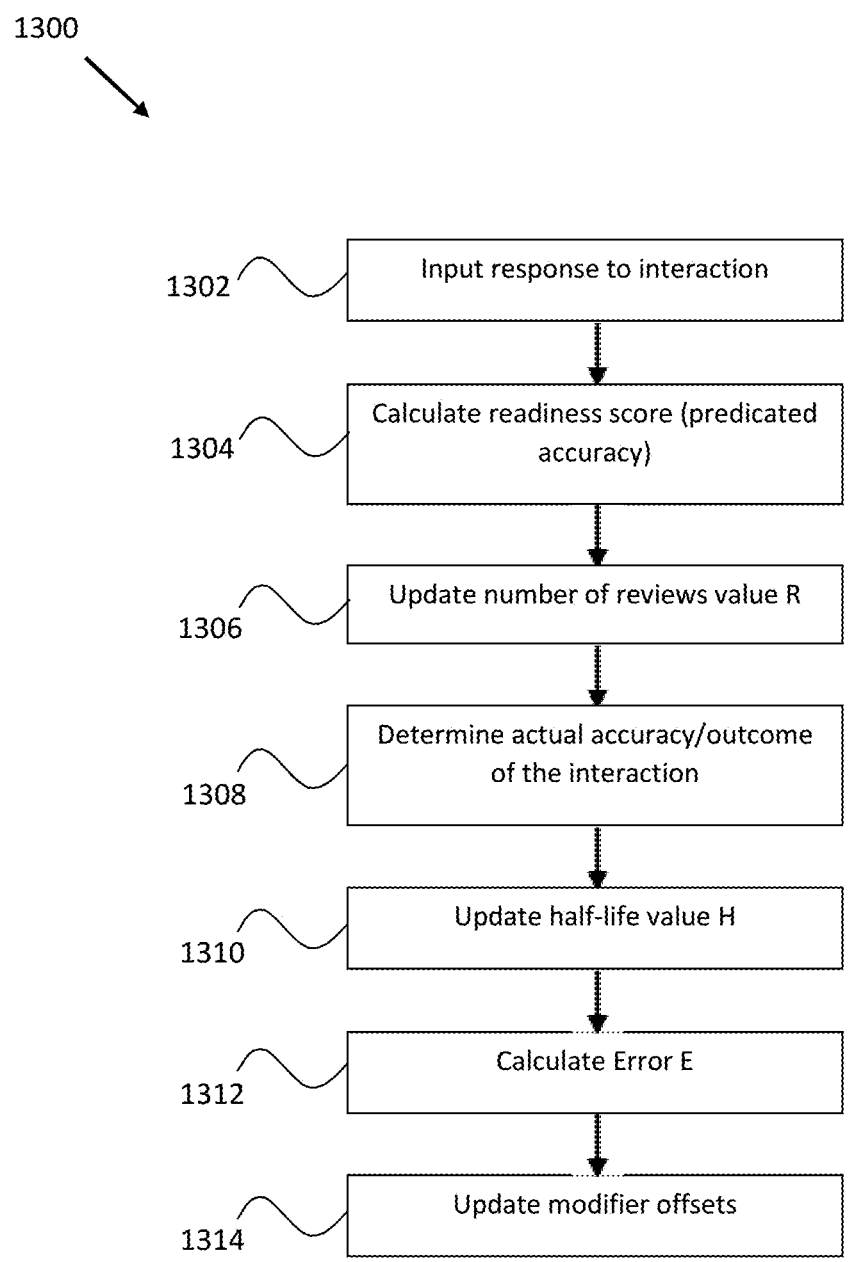
FIG. 13 illustrates processes for updating readiness score function parameters performed by a learning system in accordance with a preferred embodiment of the present invention.

In a preferred embodiment of the present invention, the function parameters of the half-life value H, the number of reviews value R, $Q_{mod}$, $C_{mod}$, and $U_{mod}$ are updated after each time a user responds to an interaction (e.g., a user inputs a response to a quiz question), as discussed in more detail below with reference the process 1300 shown in FIG. 13.

In block 1302, a user inputs a response to an interaction related to the key learnable concept. Next, in block 1304, the readiness score for the key learnable concept is calculated for the current moment (i.e., the moment at which the user input the response to the interaction) based on the current values of the half-life value H, the number of reviews value R, $Q_{mod}$, $C_{mod}$ and $U_{mod}$, and the current value of age. The current value of age is determined based on the amount of time since the key learnable concept was last encountered or reviewed by the user. As discussed above, a timestamp that indicates when the user last input a response to an interaction related to the key learnable concept can be used to calculate the value of age at the current moment. The readiness score calculated in block 1304 corresponds to a predicted accuracy for the key learnable concept and is stored by the learning system. For example, in a preferred embodiment of the present invention, the readiness score calculated in block 1304 corresponds to the predicted probability that the user correctly answered the interaction related to the key learnable concept in block 1302.

Next, in block 1306, the number of reviews value R for the key learnable concept is updated. For example, if a user has a number of reviews value R of 1 for key learnable concept A, and the user completes an interaction related to key learnable concept A, then the number of reviews value R for key learnable concept A will be increased/updated to 2. Similarly, if a user has a number of reviews value R of 2 for key learnable concept A, and has a number of reviews value R of 3 for key learnable concept B, and the user completes a quiz set that includes one interaction related to key learnable concept A and one interaction related to key learnable concept B, then after completing the quiz set the number of reviews value R for key learnable concept A will be increased/updated to 3 and the number of reviews value R for key learnable concept B will be increased/updated to 4.

Next, in block 1308, the accuracy of the interaction (the actual outcome of the interaction) is determined and stored by the learning system. Preferably, every interaction presented to the user will have an accuracy that represents the actual outcome of the interaction. For example, if the interaction is a quiz question, the accuracy of the interaction is based on the accuracy of the user's response to the quiz question. For example, the accuracy of the interaction has a value of 1 when the user answers the quiz question correctly, and the accuracy of the interaction has a value of 0 when the user answers the quiz question incorrectly. Alternatively, the accuracy of the interaction of a quiz question can have any floating value between 0 and 1 when, for example, the user's response to the quiz question is partially correct (e.g., when the user's response is misspelled but otherwise correct).

In a preferred embodiment of the present invention, when an interaction merely presents information to the user and does not include a question (e.g., the interaction is a flashcard with a term and a definition presented to the user, or the interaction is a video shown to the user), the accuracy of the interaction has a value of 1 when the user completes the interaction (e.g., views the flashcard or views the video) and has a value of 0 when the user does not complete the interaction, for example.

Next, in block 1310, the half-life value H is updated by multiplying the current half-life value H by a multiplication factor which is determined based on the accuracy of the interaction determined in block 1308. If the accuracy of the interaction is 0 (e.g., the user answered a quiz question incorrectly), the half-life H value is multiplied by a multiplication factor of 1 such that the half-life value H remains the same. On the other hand, if the accuracy of the interaction is greater than 0, the half-life value H is multiplied by a multiplication factor greater than 1 such that the half-life value H increases.

In a preferred embodiment of the present invention, the multiplication factor by which half-life value H is multiplied can be based on a value assigned to the interaction. For example, when an interaction related to a key learning concept is completed and the key learning concept was recently reviewed, then the value assigned to the interaction may be low because the act of retrieval over a short amount of time generally does not increase the retention (half-life) of the key learnable concept. In contrast, if the interaction for a key learnable concept is answered correctly after a considerable amount of time has passed since the user has last reviewed or encountered the key learnable concept, then the value assigned to the interaction may be high because the act of retrieval after a long amount of time generally does increase the retention (half-life) of the key learnable concept. The value assigned to the interaction may also be high if, for example, the interaction included a productive recall from memory, as opposed to an interaction asking a user to pick an answer from a list of answer choices. In a preferred embodiment of the present invention, the multiplication factor by which the half-life value H is multiplied can be empirically derived for different circumstances, for example.

Next, in block 1312, an error E is calculated by comparing the actual accuracy of the user's response to the interaction which was determined in block 1308 to the predicted accuracy of the user's response to the interaction which was calculated and stored in block 1304. For example, the error E=the absolute value of (actual accuracy−predicted accuracy). For example, if the predicted accuracy is 0.75 (i.e., the probability that the user answers the interaction correctly is 75%) and the actual accuracy is 1 (i.e., the user answers the interaction correctly), then the error E equals 0.25. If the predicted accuracy is 0.75 and the actual accuracy is 0 (i.e., the user answers the interaction incorrectly), then the error E equals 0.75.

Next, in block 1314, each of the $Q_{mod}$ modifier offset controlling the quiz difficulty, the $C_{mod}$ modifier offset controlling the concept difficulty, and $U_{mod}$ modifier offset controlling the user agility are updated based on a stochastic gradient descent formula. For example, in a preferred embodiment of the present invention, the stochastic gradient descent formula is: value(t+1)=value(t)+($\alpha$E/√(obs+G)). In this formula, value(t) is the initial value of the modifier; value(t+1) is the updated value of the modifier; E is the error calculated in block 1312; $\alpha$ is a learning rate which is a constant that controls how sensitive the parameter update is to new observations; obs is the total number of observations for the particular modifier offset; and G is a bayesian constant controlling the tendency of the parameter to remain close to the average of previously calculated modifier offset values before a large enough number of observations have been made. For each of the modifier offsets, the obs value which refers to the total number of observations for a particular modifier offset is initially set to 0 and then increased by 1 each time the error is calculated and the particular modifier offset is updated, as discussed in more detail below.

In a preferred embodiment of the present invention, the $Q_{mod}$ modifier offset controlling the quiz difficulty is based on the relative difficulty of an interaction presentation type (e.g., a type of quiz question such as single select multiple choice, recall type question, selecting a location on an image, etc.). This relative difficulty of an interaction presentation type is distinct from the average observed accuracy of the interaction. If a new interaction presentation type is created in the learning system, the value of $Q_{mod}$ is initially set to 0, i.e., there is initially no offset in the readiness formula for the difficulty of the interaction presentation type. As users of the learning system respond to interactions of the interaction presentation types, the $Q_{mod}$ modifier offset value changes as the number of obs value increases by 1 each time an interaction of the interaction presentation type is responded to by a user.

In a preferred embodiment of the present invention, the $C_{mod}$ modifier offset controlling the concept difficulty is based on the relative difficulty of a particular key learnable concept which corresponds to the actual relative difficulty of an interaction of the key learnable concept for an average user with a given learning history. This relative difficulty of a particular key learnable concept is distinct from the average observed accuracy of users attempting the interaction of the key learnable concept, which may be heavily influenced by confounding factors such as the ability of an individual user and the users prior learning history with the key learnable concept. If a new key learnable concept is created in the learning system, the value of $C_{mod}$ is initially set to 0, i.e., there is initially no offset in the readiness formula for the concept difficulty. As users of the learning system respond to interactions related to the particular key learnable concept, the $C_{mod}$ modifier offset value changes as the number of obs value increases by 1 each time an interaction related to the key learnable concept is responded to by a user.

In a preferred embodiment of the present invention, the $U_{mod}$ modifier offset controlling the user agility is based on an individual user's tendency to acquire and retain information to a greater or lesser degree than an average user. When a new user is created in the learning system, the value of $U_{mod}$ is initially set to 0, i.e., there is initially no offset in the readiness formula for user agility. As the user responds to interactions, the $U_{mod}$ modifier offset value changes as the number of obs value increases by 1 each time the user responds to an interaction.

Figure 14:
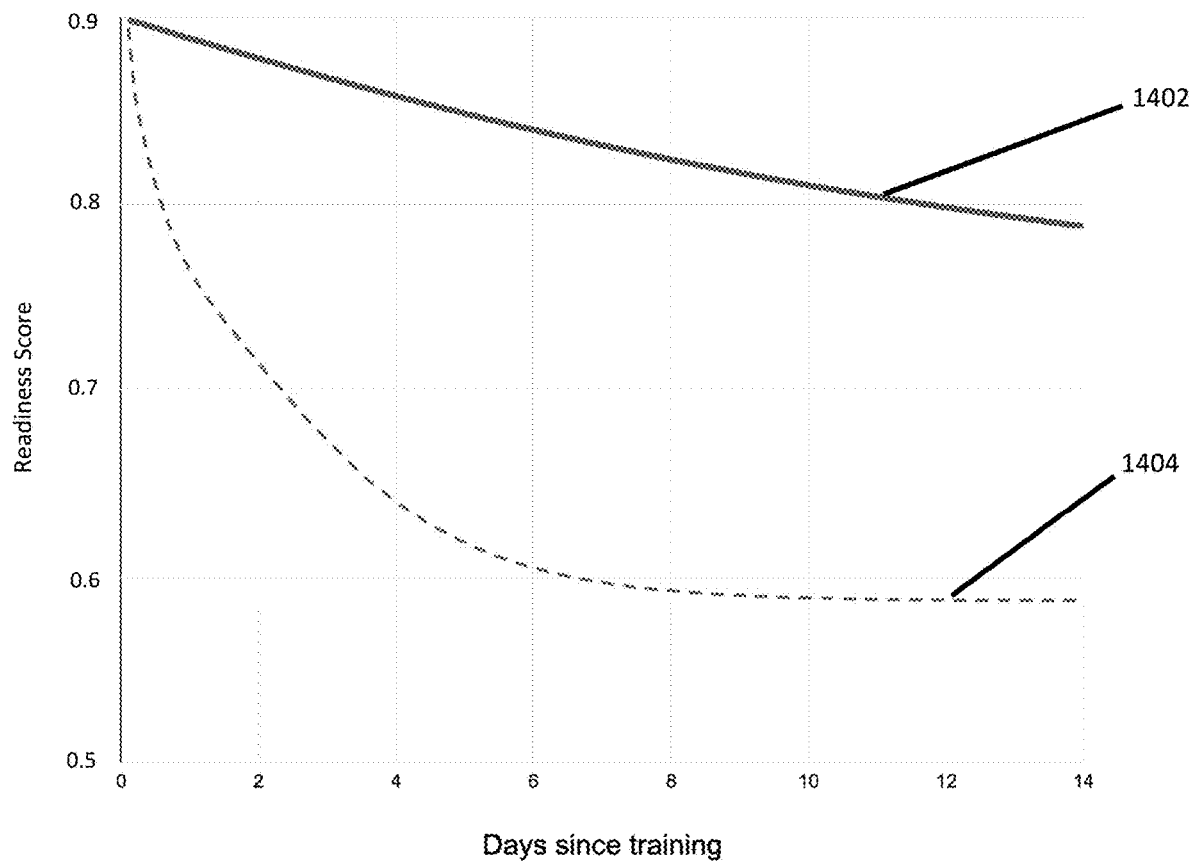
FIG. 14 illustrates readiness score curves in accordance with a preferred embodiment of the present invention.

Since the function parameters of the half-life value H, the number of reviews value R, $Q_{mod}$, $C_{mod}$ and $U_{mod}$ are updated and stored after each time a user responds to an interaction, the only remaining non-constant function parameter in the above readiness formula is age. As discussed above, age corresponds to the amount of time since the user last interacted with the key learnable concept. As a result, the updated and stored values for the function parameters of the half-life value H, the number of reviews value R, $Q_{mod}$, $C_{mod}$ and $U_{mod}$ determine a readiness score curve for the key learnable concept with respect to age, such that a readiness score for a key learnable concept for any specific moment of time in the future can be calculated based on a value of age and the updated and stored function parameter values. For example, FIG. 14 shows a graph in which the Y-axis represents a readiness score (probability of recall for the key learnable concept) and the X-axis represents age (in days), and illustrates how the readiness score decreases over time as the value of age increases. In FIG. 14, the solid line 1402 shows a curve of readiness scores for a key learnable concept for which the user has a high half-life value H, and the broken line 1404 shows a curve of readiness scores for a key learnable concept for which the user has a low half-life value H. In FIG. 14, it is assumed that no review of the key learnable concept takes place over the length of the solid line 1402 or the length of the broken line 1404 (i.e., the high half-life value H is constant).

Figure 15:
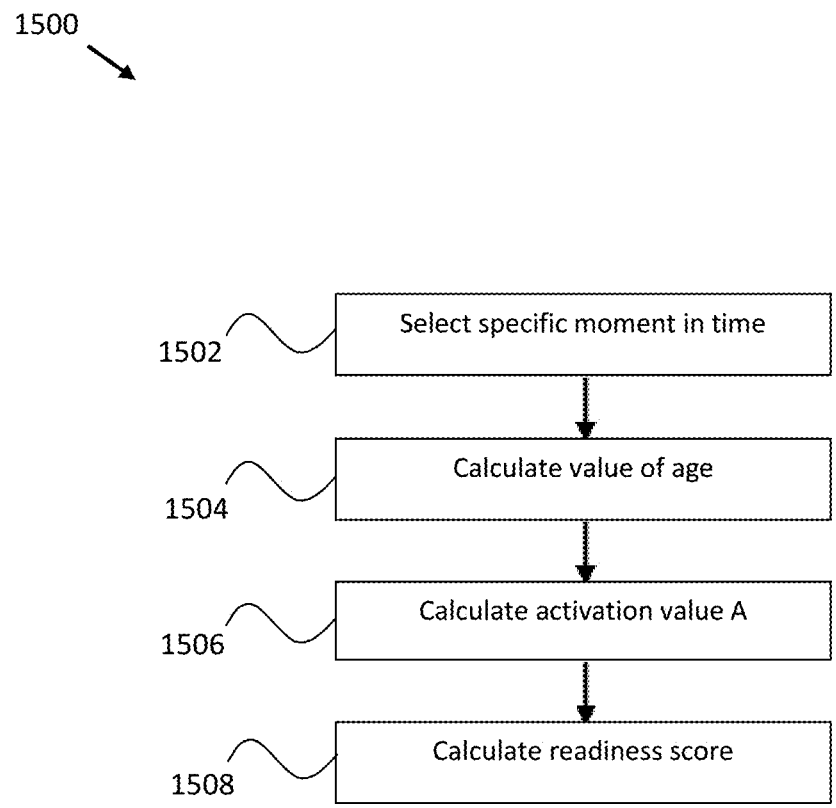
FIG. 15 illustrates processes for calculating a readiness score for a specific moment in time performed by a learning system in accordance with a preferred embodiment of the present invention.

In a preferred embodiment of the present invention, a readiness score of an individual user with respect to a key learnable concept at the specific moment in time can be calculated using the process 1500 discussed below with respect to FIG. 15.

In block 1502, a specific moment in time is selected. In block 1504, based on the specific moment in time selected in block 1502, the value of age is calculated. The value of age is calculated in the same units as the stored half-life value H. In block 1506, using the stored half-life value H and the value of age calculated in block 1504, the activation value A is calculated. Then in block 1508, using the activation value A calculated in block 1506 and the stored values for the function parameters of the number of reviews value R, $Q_{mod}$, $C_{mod}$, and $U_{mod}$, and the constants $c_0$, $c_1$, $c_2$, $c_3$ and $t_0$, $t_1$, $t_2$, the readiness score is calculated.

In the process discussed above with respect to FIG. 15, the readiness score of an individual user with respect to one key learnable concept at a specific moment is calculated. However, in a preferred embodiment of the present invention, a readiness score for a defined set of key learnable concepts at a specified moment in time can be calculated by averaging the readiness scores of the key learnable concepts included in the defined set of key learnable concepts. For example, the readiness score for a topic that includes a plurality of key learnable concepts can be calculated by averaging the readiness scores of the key learnable concepts included in the topic. In such a case, the readiness score for the topic can correspond to the expected percentage of interactions that the individual user would answer correctly if the user was tested on the key learnable concepts included in the topic at the specified moment in time.

In a preferred embodiment of the present invention, a readiness score can be calculated for a specific moment in time in the past, a current moment in time, an interval of time in the future, and a specific moment in time in the future, for example.

In a preferred embodiment of the present invention, when a readiness score is calculated for a specific moment in time in the past, the values of the function parameters of the half-life value H, the number of reviews value R, $Q_{mod}$, $C_{mod}$, and $U_{mod}$ are based on the values of the function parameters for the specific moment in time in the past for which the readiness score is being calculated. As discussed above, age corresponds to the amount of time since the user last interacted with a key learnable concept. Thus, when a readiness score is calculated for a specific moment in time in the past, the value of age corresponds to the amount of time since the user last interacted with the key learnable concept at the specific moment in time in the past for which the readiness score is being calculated.

In a preferred embodiment of the present invention, when a readiness score is calculated for a current moment in time, the current values of the function parameters of the half-life value H, the number of reviews value R, $Q_{mod}$, $C_{mod}$, and $U_{mod}$ are used to calculate the readiness score. The value of age corresponds to the amount of time since the user last interacted with the key learnable concept at the current moment in time.

In a preferred embodiment of the present invention, when a readiness score is calculated for an interval of time in the future and/or a specific moment in time in the future, the readiness score can be calculated based on one of the following assumptions: assumption (1) the user will have no further interactions with the key learnable concept; assumption (2) the user will have an optimal ongoing pattern of interaction with the key learnable concept; and assumption (3) the user will have a pattern of interactions with the key learnable concept that is consistent with the user's previous pattern of interactions with the key learnable concept.

When a readiness score is calculated based on assumption (2) or assumption (3), the values for the function parameters of age, the number of reviews value R, and the half-life value H are determined based on simulating a pattern of interactions in order to calculate the readiness score.

For assumption (2), an optimal ongoing pattern of interactions with the key learnable concept is simulated by assuming that the user will interact with the key learnable concept a predetermined number of times a day (e.g., once or twice a day), for example. For each of the individual interactions included in the simulated pattern of interactions, an outcome of the interaction is simulated (e.g., whether or not the user answered the interaction correctly) based on the readiness score calculated for the time of the simulated interaction. After each simulated interaction outcome, a simulated update to the function parameters including the half-life value H, the number of reviews value R, and a timestamp indicating the time of the most recent review of the key learnable concept is completed. The process of simulating an outcome to an interaction and updating the function parameters is repeated until all of the interactions included in the simulated pattern of interactions have been simulated. Based on the simulated updates to the function parameters, a readiness score at any point in time during the simulated pattern of interactions can be calculated. For example, the readiness score at a point in time that corresponds to the end of the simulated pattern of interactions can be calculated and shown in the user. Alternatively, a plurality of readiness scores that correspond to various points in time during the simulated pattern of interactions can be calculated and a curve of the readiness scores during the simulated pattern of interactions can be shown to the user.

For assumption (3), a pattern of interactions with the key learnable concept is simulated by assuming that the user will interact with the key learnable concept in a manner consistent with a historical activity of the user (e.g., an average number of times each day that a user has interacted with the key learnable concept in the past). Preferably, the process of simulating interactions and simulating updates to the function parameters is repeated until all of the interactions included in the simulated pattern of interactions have been simulated, as discussed above with respect to assumption (2).

In a preferred embodiment of the present invention, assumptions (1)-(3) can be used to calculate a readiness score for a variety of scenarios. For example, using assumption (1), readiness scores can be calculated for an interval of time in the future (e.g., a range of dates such as April 1-April 14) with the assumption that the user will have no further interactions with the key learnable concept. For example, the readiness scores for the interval of time in the future can be used to determine if a user is prepared to participate in a live training exercise or a deployment that starts during the interval of time in the future and requires the user's readiness score to be no less than a particular readiness score, even if the user will not have any further interactions with the key learnable concept prior to the start of the live training exercise or the deployment.

Additionally, based on assumption (3), a user preparing for a high-stakes citizenship, board, or language exam is able to enter a specific moment in time in the future (the date of the exam) and predict whether or not the user will be ready for the exam if the user continues to interact with the key learnable concepts as the user has been in the past. That is, the user is able to predict the score on the exam based on readiness scores calculated based on an assumption that the user will have a pattern of interaction with the key learnable concepts on the exam that is consistent with the user's previous pattern of interaction with the key learnable concepts.

In a preferred embodiment of the present invention, a readiness score can be used to identify an expert for a topic, for example, an expert for tutoring or consulting for the topic. For example, a readiness score of a user for a topic for a current moment in time can be used to identify the user as a current expert for the topic. In a preferred embodiment of the present invention, in order to identify the expert for the topic, the topic is defined in the form of a set of key learnable concepts (a plurality of key learnable concepts). The key learnable concepts can be extracted from a legal document, for example. A readiness score of the user for each of the key learnable concepts included in the defined topic is calculated. Then, the readiness scores for the key learnable concepts that define the topic are averaged to generate a readiness score for the defined topic.

Figure 16:
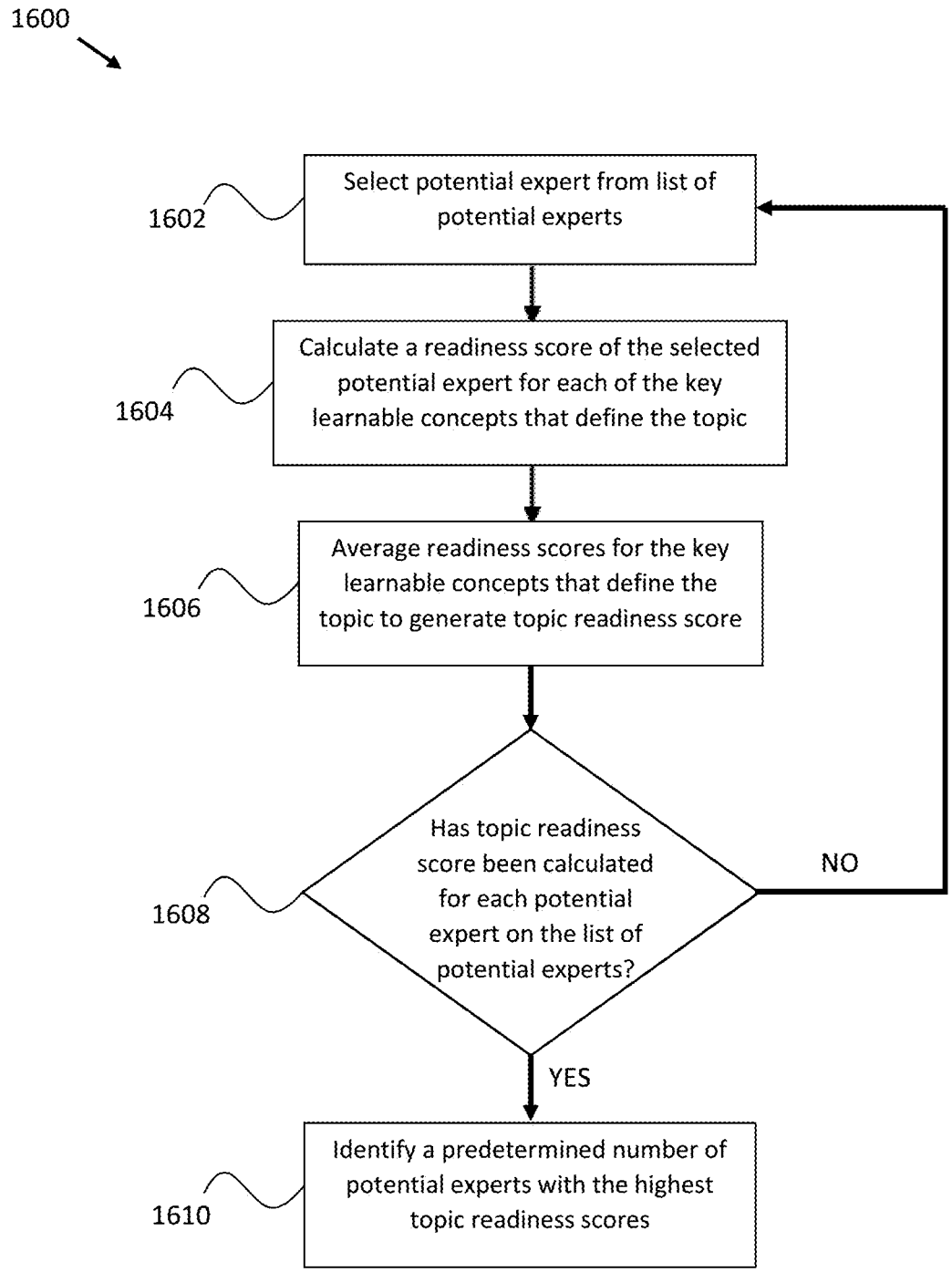
FIG. 16 illustrates processes for identifying an expert for a particular topic performed by a learning system in accordance with a preferred embodiment of the present invention.

An example of a process in which an expert (e.g., a user of the learning system) for a topic defined by a set of key learnable concepts is identified from a list of potential experts is discussed below with reference to the process shown in FIG. 16.

In block 1602, a first potential expert is selected from the list of potential experts. Then, in block 1604, a readiness score of the first potential expert for each key learnable concept in the topic is calculated. When the first potential expert has not yet reviewed a key learnable concept, the readiness score of the first potential expert for that key learnable concept can be set to a predetermined value such as 0. Alternatively, the readiness score for the key learnable concept that has not yet been reviewed by the first potential expert can be approximated based on the readiness score of the first potential expert for one or more key learnable concepts that are semantically similar to the key learnable concept that has not yet been reviewed by the first potential expert.

Once a readiness score of the first potential expert for each key learnable concept in the defined topic is calculated, the readiness scores for the key learnable concepts that define the topic are averaged to generate a readiness score for the defined topic (block 1606). Then, blocks 1602 through block 1608 are repeated for each of the other potential experts included in the list of potential experts until a readiness score for the defined topic for each of the potential experts included on the list of potential experts has been calculated.

Once a readiness score for the defined topic has been calculated for each of the potential experts included on the list of potential experts, the process proceeds to block 1610. In block 1610, the learning system returns/identifies a pre-determined number of potential experts with the highest readiness scores for the defined topic. In a preferred embodiment of the present invention, the learning system is able to send requests, for example, by email and/or by application notification, to the potential experts with the highest readiness scores to accept or decline a task offer for tutoring or consulting for the topic, for example.

The above-discussed process for identifying an expert for a topic has advantages over conventional processes for identifying an expert for a topic such as identifying an expert based on previous board exam scores or course grade scores of potential experts. For example, one advantage is that the readiness scores calculated in the above-discussed process represent the current knowledge state (readiness) of the potential experts, while conventional processes provide a measure of the knowledge state of the potential expert from a single moment in time in the past, e.g., the moment in time at which a previous board exam was administered.

Additionally, another advantage compared to conventional processes is that the readiness scores in the above-discussed process are calculated at the key learnable concept level. Therefore, readiness scores corresponding to a plurality of key learnable concepts can be easily aggregated, such that the readiness scores can be used to calculate the readiness score for any subset of content, including a subset of content that is defined post-hoc (e.g., a newly defined topic). For example, a new topic can be defined, and the readiness score for this topic can be calculated based on the readiness scores of the user for the key learnable concepts that are included in the newly defined topic.

Thus, in a preferred embodiment of the present invention, the learning system can be used to identify a user that has the most active knowledge for a specific topic or task defined, as opposed to merely identifying a generally qualified user. For example, the learning system is able to identify an individual user with the greatest active/current expertise or readiness for a specific topic/task, and the individual user can in turn receive requests for tasks that they know they can complete very quickly.

In a preferred embodiment of the present invention, a user can automatically be navigated through the user's knowledge mesh based on the readiness scores of the user for the key learnable concepts included in the user's knowledge mesh.

In a preferred embodiment of the present invention, a user is able to select a starting point within the user's knowledge mesh from which the user will be automatically navigated through the user's knowledge mesh by the learning system. For example, the user can select a starting point within the user's knowledge mesh by selecting a concept node (e.g., concept node 304 shown in FIG. 3) of the user's knowledge mesh or selecting a topic node (e.g., topic node 302 shown in FIG. 3) of the user's knowledge mesh. The concept node or the topic node can be selected by the user clicking on the concept node or the topic node on the I/O Interface 230/240, for example. The topic node can also be selected by the user by searching the topic title (e.g., the user searching the topic title of "Latin" for topic node 302). Alternatively, the user is able to prompt the learning system to select a starting point of the concept node that corresponds to the key learnable concept in most need of refreshing (e.g., the concept node that corresponds to the key learnable concept for which the user has the lowest readiness score). For example, the user is able to prompt the learning system to select a starting point of the concept node that corresponds to the key learnable concept in most need to refreshing by pressing the button 402 shown in FIG. 4.

In a preferred embodiment of the present invention, a user is automatically navigated through the user's knowledge mesh based on the readiness scores of the key learnable concepts. For example, if the user selects a starting point within the user's knowledge mesh by selecting a concept node, after reviewing the key learnable concept corresponding to the selected concept node (e.g., completing the one or more interactions related to the key learnable concept), the user is then directed to the concept node in the user's knowledge mesh that corresponds to the key learnable concept with the lowest current readiness score regardless of whether or not the key learnable concept is within the same topic as the key learnable concept of the concept node that was selected as the starting point. The above process of directing the user to the concept node in the user's knowledge mesh that corresponds to the key learnable concept with the lowest current readiness score can be repeated until the user has reviewed all of the key learnable concepts included in the user's knowledge mesh. In this manner, by reviewing key learnable concepts in ascending order of readiness score, the user is able to increase the readiness score for the plurality of key learnable concepts.

Alternatively, after reviewing the key learnable concept corresponding to the concept node selected as the starting point, the user can be directed to the concept node in the user's knowledge mesh that corresponds to the key learnable concept with the lowest current readiness score among the key learnable concepts included in the same topic as the key learnable concept of the concept node that was selected as the starting point. The process of directing the user to the concept node in the user's knowledge mesh that corresponds to the key learnable concept with the lowest current readiness score and within the same topic is repeated until the user has reviewed all of the key learnable concepts included in the topic. Then, the user can be directed to a concept node that corresponds to a key learnable concept included in a different topic.

In a preferred embodiment of the present invention in which a user selects a starting point within the user's knowledge mesh by selecting a topic node of the user's knowledge mesh, the user is started at a first concept node that corresponds to the key learnable concept that has the lowest current readiness score among the key learnable concepts included in the selected topic. After the user has reviewed the key learnable concept that corresponds to the first concept node, the user is navigated to the concept node that corresponds to the key learnable concept with the next lowest current readiness score among the key learnable concepts included in the topic. Preferably, the above process is repeated until all of the key learnable concepts included in the selected topic have been reviewed. In other words, the user is navigated to the concept nodes of the selected topic according to an ascending order of readiness scores of the key learnable concepts that correspond to the concept nodes. Once all of the key learnable concepts within the selected topic have been reviewed, the user can be navigated to a concept node that corresponds to a key learnable concept in a topic other than the selected topic.

In a preferred embodiment of the present invention, a user can automatically be navigated through the user's knowledge mesh based on the semantic similarity between the key learnable concepts in the user's knowledge mesh and one or more goals of the user (e.g., a goal of studying a certain topic or preparing for an upcoming exam). For example, using the API endpoint discussed above, a semantic similarity score between each of the key learnable concepts included in the user's knowledge mesh and the one or more goals of the user can be calculated.

Based on the semantic similarity scores for each of the key learnable concepts, the user is navigated to the concept nodes that correspond to the key learnable concepts in descending order of semantic similarity. In other words, the user is first navigated to the concept node that corresponds to key learnable concept with the highest semantic similarity to the one or more goals of the user, and then the user is navigated to the concept nodes that correspond to key learnable concepts in decreasing order of semantic similarity, such that key learnable concepts most relevant (semantically similar) to the one or more goals of the user are prioritized/reviewed first.

In a preferred embodiment of the present invention, a user can automatically be navigated through the user's knowledge mesh based on both the readiness scores for the key learnable concepts included in the user's knowledge mesh and the semantic similarities between the key learnable concepts in the user's knowledge mesh and one or more goals of the user. For example, the order of the concept nodes in which the user is navigated can be determined based on a weighted sum in which a semantic similarity score between the key learnable concept corresponding to the concept node in the user's knowledge mesh and one or more goals of the user (e.g., a goal of studying a certain topic or preparing for an upcoming exam) has a positive weight and the readiness score of the key learnable concept corresponding to the concept node has a negative weight. Based on the weighted sum calculated for each of the key learnable concepts that correspond to the concept nodes, the user is navigated to the concept nodes in descending order of the value of the weighted sums. The weighted sum balances the competing priorities of reviewing relevant key learnable concepts (the key learnable concepts most semantically similar to the one or goals of the user) and reviewing key learnable concepts that have the lowest readiness scores.

In a preferred embodiment of the present invention, each key learnable concept is reviewed once in a learning session of the user during which the user is navigated through the user's knowledge mesh. Alternatively, a learning session can allow a user to review one or more key learning concepts twice or more, for example, immediately before a closed-book exam. During a learning session in which a key learnable concept is reviewed twice or more, a key learnable concept can be prioritized if the user has recently incorrectly answered an interaction related to the key learnable concept. For example, the key learnable concept can be presented to the user again before a different key learnable concept is presented to the user. The difficulty of interactions may also be increased, for example, by asking a question as a productive recall (an interaction that requires the user to input the answer to the question) rather than a multiple-choice question in which the user is prompted to select an answer from among a plurality of answer choices which are visible to the user.

In preferred embodiments of the present invention, after each response to an interaction related to a key learnable concept, the user will be navigated to the next, most appropriate concept node based on personal and learning science criteria. In a preferred embodiment of the present invention, this can include navigating the user to a concept node that corresponds to a key learnable concept not originally in the user's knowledge mesh. For example, once a certain knowledge state (e.g., readiness score) has been reached for all existing key learnable concepts in the user's knowledge mesh, new key learnable concepts and topics for the user to be navigated to can be created based on key learnable concepts and topics that already exist in the user's knowledge mesh. For example, the greedy algorithm discussed above can be used to create new topics and key learnable concepts to add to the user's knowledge mesh.

Preferred embodiments of the present invention provide a user knowledge mesh in which each element of the user knowledge mesh (e.g., a concept node or a topic node), or any combination of these, corresponds to one or more key learnable concepts for which the learning system stores a knowledge state (e.g., a readiness score) for the user. This is advantageous compared to a conventional grade for a course in which the relationship between the grade (e.g., an A) and the actual declarative knowledge (e.g., a list of concepts or skills) is ambiguous. For example, to interpret what an individual that received a grade of an A in a Mathematics course has actually learned requires access to the curriculum of the specific course for which the individual scored the grade. Furthermore, two people with similar grades from different Mathematics courses may have different levels of knowledge of Linear Algebra for example, depending on the specific curriculum each Mathematics course followed, which may also be the case for the same course and course provider taken at different moments in time since the curriculum of a course may change. Furthermore, even with access to the specific curriculum, it is not possible to determine from traditional course grades how well an individual performed on each part of the curriculum because doing so would also require access to the individual's specific transcript from the institution which may not be available, and/or be presented in a non-standard format. Furthermore, even with a transcript, the user's knowledge state for individual concepts or topics are still ambiguous since they are fixed numbers, based on a moment or period of time in the past. For example, a course transcript may reveal that two individuals in the same course each achieved a score of 80% on the final exam for Linear Algebra. In this case, it is not possible to know which individual has retained more of the material over time, and hence what the current knowledge state for each individual might be. Additionally, an exam can only ever test a subset of the material being learned in a course. A first individual may have scored 80% because the first individual built a strong understanding of the entire Linear Algebra course while a second individual may have scored 80% because the second individual focused on a subset of content and was fortunate that the exam covered that subset of content and not another. In short, exam scores and other moment-in-time course outcomes and grades are often used as proxies for knowledge state because they are available, but they do not directly correspond to an individual's current knowledge state, especially as time since the exam passes.

In contrast, in a preferred embodiment of the present invention, a knowledge state (readiness score) for each individual key learnable concept in a user's knowledge mesh can be calculated. In other words, the knowledge state is up to date based on the most recent interaction related to the key learnable concept completed by the user and the knowledge state can be calculated for a current moment in time, for example, by calculating a readiness score for a current moment in time. Additionally, because the knowledge state is defined for each individual key learnable concept, a knowledge state for a group of one or more key learnable concepts can be calculated, even if the group of the one or more key learnable concepts is defined post-hoc. For example, a user is able to select any topic or key learnable concept, or even generate a new topic as detailed above, and the learning system can provide a corresponding knowledge state of the user.

In a preferred embodiment of the present invention, the knowledge state for a new or unseen key learnable concept can be inferred from the knowledge state of the user for semantically similar key learnable concepts. For example, a predetermined number of the most semantically similar key learnable concepts that have been learned by the user may be used to infer the knowledge state of the new or unseen key learnable concept. For example, in a preferred embodiment of the present invention, a readiness score of the new or unseen key learnable concept can be inferred/calculated by averaging the readiness scores of a predetermined number of the key learnable concepts that have been learned by the user and are most semantically similar to the new or unseen key learnable concept. In a preferred embodiment of the present invention, the readiness scores of the predetermined number of the key learnable concepts that have been learned by the user and are most semantically similar to the new or unseen key learnable concept can be weighted according to their semantic similarity to the new or unseen key learnable concept when the readiness score of the new or unseen key learnable concept is calculated/inferred.

Alternatively, in a preferred embodiment of the present invention, a knowledge state for a new or unseen key learnable concept can be inferred from the knowledge state of the user for semantically similar key learnable concepts using a machine learning model such as a neural network. For example, the machine learning model can have input parameters of a half-life value H and a semantic similarity to the new or unseen key learnable concept for a predetermined number of key learnable concepts that are most semantically similar to the new or unseen key learnable concept. The machine learning model can be trained on the existing dataset to generate an estimate of the half-life value or prior knowledge, and a readiness score derived from the half-life value H and setting the value of age to be a moderately large time interval such as 3 months.

Where applicable, various preferred embodiments of the present invention can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Although illustrative example embodiments have been shown and described, a wide range of modifications, changes, and substitutions are contemplated in the foregoing disclosure and in some instances, some features of the preferred embodiments of the present invention may be used without a corresponding use of other features. One of ordinary skill in the art would recognize many variations, alternatives, and modifications of the illustrative example embodiments and preferred embodiments of the present invention are possible. Thus, the scope of the present application should be limited only by the following claims, and it is appropriate that the claims be construed broadly and in a manner consistent with the scope of the illustrative example embodiments and preferred embodiments disclosed herein.

What is claimed is:

1. A learning system comprising:
a non-transitory memory; and
one or more hardware processors configured or programmed to read instructions from the non-transitory memory to cause the learning system to perform operations including:
generating a user knowledge mesh including:
generating a plurality of topic nodes, each of the plurality of topic nodes corresponding to a topic included in the user knowledge mesh; and
generating a plurality of concept nodes, each of the plurality of concept nodes corresponding to a key learnable concept;
updating the user knowledge mesh by deleting all existing connections between the plurality of topic nodes; and
generating new connections between the plurality of topic nodes based on the semantic similarities between the topics corresponding to the plurality of topic nodes; wherein
each of the plurality of topic nodes is connected to another one of the plurality of topic nodes;
each of the plurality of concept nodes is connected to one of the plurality of topic nodes;
each of the plurality of key learnable concepts includes one or more interactions related to the key learnable concept; and
the deleting of all the existing connections between the plurality of topic nodes and the generating of the new connections between the plurality of topic nodes are performed when a predetermined number of new topics have been added to the user knowledge mesh.

2. The learning system of claim 1, wherein the operations further include:
calculating a semantic similarity between a first topic that corresponds to a first topic node of the plurality of topic nodes and a second topic that corresponds to a second topic node of the plurality of topic nodes; and
generating a line that connects the first topic node and the second topic node; wherein
a length, a thickness, and/or a brightness of the line is generated based on the semantic similarity between the first topic and the second topic.

3. The learning system of claim 1, wherein the operations further include:
changing a color of one of the plurality of concept nodes when a user readiness for the key learnable concept that corresponds to the one of the plurality of concept nodes is above a predetermined readiness threshold.

4. The learning system of claim 1, wherein the operations further include:
generating a new topic to include in the user knowledge mesh including:
identifying a desired topic that is input by a user of the user knowledge mesh and that corresponds to the new topic;
determining whether or not the desired topic input by the user already exists in the learning system by determining if a previously created topic that corresponds to the desired topic is already stored in the non-transitory memory; and
adding the previously created topic that corresponds to the desired topic to the user knowledge mesh when it is determined that the desired topic input by the user already exists in the learning system; wherein
the previously created topic that corresponds to the desired topic is determined to already be stored in the non-transitory memory based on the previously created topic being a lexical match to the desired topic and/or a vector distance between a representation of the previously created topic and a representation of the desired topic in a semantic embedding model.

5. The learning system of claim 4, wherein the determining whether or not the desired topic input by the user already exists in the learning system includes measuring a relevancy of each of a plurality of previously created and stored topics to content already included in the user knowledge mesh.

6. The learning system of claim 1, wherein the operations further include:
generating a new topic to include in the user knowledge mesh including:
identifying a desired topic that is selected by a user of the user knowledge mesh and that corresponds to the new topic; wherein
the desired topic is selected directly from a list of topics that includes a plurality of topics that have already been created and stored in the non-transitory memory; and
the plurality of topics included in the list of topics have been filtered based on an average or minimum quality.

7. The learning system of claim 1, wherein the operations further include:
generating a new topic to include in the user knowledge mesh including:
identifying a desired topic that is input by a user of the user knowledge mesh and that corresponds to the new topic;
searching for the desired topic in an open source data set to identify a related open source document;
using natural language processing to extract one or more new key learnable concepts from the related open source document; and
generating one or more new interactions for each of the one or more new key learnable concepts.

8. The learning system of claim 7, wherein the generating the one or more new interactions includes:
using natural language processing and the related open source document to generate a definition for each of the one or more new key learnable concepts;
generating, for each of the one or more new key learnable concepts, one or more distractors based on the definition of the new key learnable concept; and
generating, for each of the one or more new key learnable concepts, the one or more new interactions based on the definition of the new key learnable concept and the one or more distractors.

9. The learning system of claim 1, wherein the operations further include:
generating a new topic and a corresponding new topic node;
calculating a sematic similarity between the new topic and each of the plurality of topics that already exist in the user knowledge mesh; and
connecting the new topic node to one of the plurality of topic nodes corresponding to the one of the plurality of topics with a highest semantic similarity to the new topic.

10. The learning system of claim 1, wherein the operations further include:
generating a new topic and a corresponding new topic node;
determining a number of connections of the new topic node and a number of connections of one of the plurality of topic nodes that already exists in the user knowledge mesh; and
determining whether or not to connect the new topic node to the one of the plurality of topic nodes that that already exists in the user knowledge mesh based on a sum of the number of connections of the new topic node and the number of connections of the one of the plurality of topic nodes that already exists in the user knowledge mesh.

11. The learning system of claim 1, wherein the operations further include:
generating a new topic based on the key learnable concepts that already exist in the user knowledge mesh; wherein
the generating the new topic includes:
identifying a desired topic input by a user of the user knowledge mesh;
identifying one or more topics that already exist in the user knowledge mesh and are related to the desired topic based on semantic similarities between the one or more topics that already exist in the user knowledge mesh and the desired topic;
identifying one or more key learnable concepts from the one or more topics identified based on semantic similarities between the one or more key learnable concepts and the desired topic; and
creating the new topic using a predetermined number of the one or more key learnable concepts identified.

12. The learning system of claim 1, wherein the operations further include:
generating a new topic based on the plurality of topics that already exist in the user knowledge mesh; wherein
the generating the new topic includes:
calculating a semantic similarity score between each of a plurality of potential new topics and one or more goals of a user of the user knowledge mesh;
calculating a semantic similarity score between each of the plurality of potential new topics and the plurality of topics that already exist in the user knowledge mesh;
calculating, for each of the plurality of potential new topics, a weighted sum in which the semantic similarity between the potential new topic and the one or more goals of the user is added and the semantic similarity between the potential new topic and the plurality of topics that already exist in the user knowledge mesh is subtracted; and
selecting the potential new topic that has a highest weighted sum as the new topic.

13. The learning system of claim 12, wherein the operations further include:
calculating a quality of the plurality of topics that already exist in the user knowledge mesh; and
generating the new topic based on the quality of the plurality of topics that already exist in the user knowledge mesh; wherein
the quality of the plurality of topics that already exist in the user knowledge mesh are calculated based on a quality of the one or more interactions included in the plurality of topics.

14. The learning system of claim 1, wherein the operations further include:
generating a key learnable concept that corresponds to one of the plurality of concept nodes using a document and/or a file identified by a user of the learning system; wherein the generating the key learnable concept includes:
  identifying content of the document and/or the file; and
  identifying the key learnable concept from the content of the document and/or the file.

15. The learning system of claim 1, wherein the operations further include:
  generating a key learnable concept that corresponds to one of the plurality of concept nodes using at least one of a videoconferencing platform, a teleconferencing platform, and an application; wherein
  the generating the key learnable concept includes:
    identifying content of a meeting based on an input received by a user device; and
    identifying the key learnable concept from the content of the meeting.

16. The learning system of claim 15, wherein
  the input received by the user device identifies a particular point in time during the meeting; and
  a predetermined amount of content of the meeting from prior to the input being received by the user device is identified as the content of the meeting from which the key learnable concept is identified.

17. The learning system of claim 1, wherein the operations further include:
  determining a readiness score of a user with respect to each of the plurality of key learnable concepts; and
  automatically navigating the user through the user knowledge mesh by directing the user to the concept node that corresponds to the key learnable concept for which the user has a lowest readiness score; wherein
  the determining the readiness score of the user with respect to each of the plurality of key learnable concept includes:
    calculating an age value corresponding to an amount of time since the key learnable concept was last reviewed by the user;
    calculating an interim knowledge state value based on the age value and a half-life value that represents an estimated half-life of the memory of the user with respect to the key learnable concept; and
    calculating the readiness score of the user with respect to the key learnable concept based on the interim knowledge state value and a number of times the user has reviewed the key learnable concept.

18. The learning system of claim 1, wherein the operations further include:
  determining a semantic similarity between each of the plurality of key learnable concepts and one or more goals of the user; and
  automatically navigating the user through the user knowledge mesh by directing the user to the concept node that corresponds to the key learnable concept that has a highest semantic similarity to the one or more goals of the user.

19. A learning system comprising:
  a non-transitory memory; and
  one or more hardware processors configured or programmed to read instructions from the non-transitory memory to cause the learning system to perform operations including:
  generating a user knowledge mesh including:
    generating a plurality of topic nodes, each of the plurality of topic nodes corresponding to a topic included in the user knowledge mesh; and
    generating a plurality of concept nodes, each of the plurality of concept nodes corresponding to a key learnable concept; and
  generating a new topic based on the plurality of topics that already exist in the user knowledge mesh; wherein
  each of the plurality of topic nodes is connected to another one of the plurality of topic nodes;
  each of the plurality of concept nodes is connected to one of the plurality of topic nodes; and
  each of the plurality of key learnable concepts includes one or more interactions related to the key learnable concept; and
  the generating the new topic includes:
    calculating a semantic similarity score between each of a plurality of potential new topics and one or more goals of a user of the user knowledge mesh;
    calculating a semantic similarity score between each of the plurality of potential new topics and the plurality of topics that already exist in the user knowledge mesh;
    calculating, for each of the plurality of potential new topics, a weighted sum in which the semantic similarity between the potential new topic and the one or more goals of the user is added and the semantic similarity between the potential new topic and the plurality of topics that already exist in the user knowledge mesh is subtracted;
    selecting the potential new topic that has a highest weighted sum as the new topic;
    adjusting a weight of the semantic similarity score between each of the plurality of potential new topics and the one or more goals of the user to control how closely the selected new topic is to the one or more goals of the user; and
    adjusting a weight of the semantic similarity score between each of the plurality of potential new topics and the plurality of topics that already exist in the user knowledge mesh to control how similar the selected new topic is to the plurality of topics that already exist in the user knowledge mesh.

20. A learning system comprising:
  a non-transitory memory; and
  one or more hardware processors configured or programmed to read instructions from the non-transitory memory to cause the learning system to perform operations including:
  generating a user knowledge mesh including:
    generating a plurality of topic nodes, each of the plurality of topic nodes corresponding to a topic included in the user knowledge mesh; and
    generating a plurality of concept nodes, each of the plurality of concept nodes corresponding to a key learnable concept;
  determining a readiness score of a user with respect to each of the plurality of key learnable concepts;
  determining a semantic similarity between each of the plurality of key learnable concepts and one or more goals of the user;
  calculating, for each of the plurality of key learnable concepts, a weighted sum in which the semantic similarity score between the key learnable concept and the one or more goals of the user has a positive weight and the readiness score of the user with respect to the key learnable concept has a negative weight; and
  automatically navigating the user through the user knowledge mesh by directing the user to the concept node that corresponds to the key learnable concept with a highest weighted sum; wherein each of the plurality of topic nodes is connected to another one of the plurality of topic nodes;

each of the plurality of concept nodes is connected to one of the plurality of topic nodes; and each of the plurality of key learnable concepts includes one or more interactions related to the key learnable concept;

the determining the readiness score of the user with respect to each of the plurality of key learnable concept includes:

calculating an age value corresponding to an amount of time since the key learnable concept was last reviewed by the user;

calculating an interim knowledge state value based on the age value and a half-life value that represents an estimated half-life of the memory of the user with respect to the key learnable concept; and calculating the readiness score of the user with respect to the key learnable concept based on the interim knowledge state value and a number of times the user has reviewed the key learnable concept.

21. A learning system comprising:

a non-transitory memory; and one or more hardware processors configured or programmed to read instructions from the non-transitory memory to cause the learning system to perform operations including:

determining a readiness score of a user with respect to a key learnable concept;

when a new key learnable concept has not been reviewed by the user, determining a predetermined number of key learnable concepts that have been reviewed by the user and are most semantically similar to the new key learnable concept that has not been reviewed by the user; and averaging a plurality of readiness scores of the user with respect to the predetermined number of key learnable concepts that have been reviewed by the user to calculate a readiness score of the user with respect to the new key learnable concept that has not been reviewed by the user; wherein the determining the readiness score of the user with respect to the key learnable concept includes:

selecting a specific moment in time;

calculating an age value based on the specific moment in time selected, the age value corresponding to an amount of time since the key learnable concept was last reviewed by the user;

calculating an interim knowledge state value based on the age value and a half-life value that represents an estimated half-life of the memory of the user with respect to the key learnable concept; and calculating the readiness score of the user with respect to the key learnable concept based on the interim knowledge state value and a number of times the user has reviewed the key learnable concept.

22. The learning system of claim 21, wherein the operations further include:

determining the readiness score of the user with respect to the key learnable concept when the user responds to an interaction related to the key learnable concept, the readiness score corresponding to a predicted accuracy of the interaction;

updating the number of times the user has reviewed the key learnable concept;

determining an actual accuracy of the interaction; and updating the half-life value based on the actual accuracy of the interaction.

23. The learning system of claim 21, wherein the readiness scores of the user with respect to the predetermined number of the key learnable concepts that have been reviewed by the user are weighted according to their semantic similarity to the new key learnable concept when the readiness score of the user with respect to the new key learnable concept is calculated.

24. The learning system of claim 21, wherein the readiness score of the user is based on one or more of a modifier offset based on an interaction difficulty, a modifier offset based on a concept difficulty, and a modifier offset based on a user agility of the user.

25. The learning system of claim 24, wherein the operations further include:

calculating an error value based on the actual accuracy of the interaction and the predicted accuracy of the interaction; and updating the one or more of the modifier offset based on the interaction difficulty, the modifier offset based on the concept difficulty, and the modifier offset based on the user agility based on the error value.

26. The learning system of claim 21, wherein the readiness score of the user with respect to the key learnable concept is determined for a specific moment in time in the future;

the readiness score is calculated based on an assumption that the user will have an optimal ongoing pattern of interactions with the key learnable concept or an assumption that the user will have a pattern of interactions with the key learnable concept that is consistent with a user's previous pattern of interactions with the key learnable concept; and when the readiness score is calculated, the age value, the half-life value, and the number of times the user has reviewed the key learnable concept are determined based on simulating the optimal ongoing pattern of interactions or based on simulating the pattern of interactions with the key learnable concept that is consistent with the user's previous pattern of interactions with the key learnable concept.

27. The learning system of claim 21, wherein the operations further include:

calculating a plurality of readiness scores of the user with respect to a plurality of key learnable concepts; and calculating a readiness score of the user with respect to a topic defined by the plurality of key learnable concepts by averaging the plurality of readiness scores of the user with respect to the plurality of key learnable concepts.

28. A learning system comprising:

a non-transitory memory; and one or more hardware processors configured or programmed to read instructions from the non-transitory memory to cause the learning system to perform operations including:

determining, for each of a plurality of users, a plurality of readiness scores with respect to a plurality of key learnable concepts;

calculating, for each of the plurality of users, a readiness score for a topic defined by the plurality of key learnable concepts by averaging the plurality of readiness scores with respect to the plurality of key learnable concepts;

identifying a predetermined number of the plurality of users with the highest readiness scores for the topic defined by the plurality of key learnable concepts; wherein the determining the plurality of readiness scores with respect to the plurality of key learnable concepts includes:

selecting a specific moment in time;

calculating an age value based on the specific moment in time selected, the age value corresponding to an amount of time since the key learnable concept was last reviewed by the user;

calculating an interim knowledge state value based on the age value and a half-life value that represents an estimated half-life of the memory of the user with respect to the key learnable concept; and calculating the readiness score of the user with respect to the key learnable concept based on the interim knowledge state value and a number of times the user has reviewed the key learnable concept.

* * * * *